(12) United States Patent
Kitabayashi et al.

(10) Patent No.: US 6,894,841 B2
(45) Date of Patent: May 17, 2005

(54) DEVICE AND METHOD FOR POSITIONAL ADJUSTMENT OF LIGHT MODULATOR

(75) Inventors: Masashi Kitabayashi, Horigahe-mura (JP); Koichi Kojima, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 83 days.

(21) Appl. No.: 10/362,757

(22) PCT Filed: Feb. 26, 2002

(86) PCT No.: PCT/JP02/01723

§ 371 (c)(1),
(2), (4) Date: Mar. 6, 2003

(87) PCT Pub. No.: WO02/069019

PCT Pub. Date: Sep. 6, 2002

(65) Prior Publication Data

US 2004/0095652 A1    May 20, 2004

(51) Int. Cl.[7] .............................................. G02B 27/10
(52) U.S. Cl. ........................................ 359/634; 353/33
(58) Field of Search ................ 359/634, 629, 359/618, 237; 353/31, 32, 33, 34; 348/336, 337, 338

(56) References Cited

U.S. PATENT DOCUMENTS 6,568,811 B2 * 5/2003 Noda et al. ..................... 353/31
6,760,097 B2 * 7/2004 Kitabayashi et al. ....... 356/124.5

FOREIGN PATENT DOCUMENTS

| JP | A 2000-147448 | 5/2000 |
| JP | A 2000-147654 | 5/2000 |
| JP | A 2000-221589 | 8/2000 |
| JP | A 2000-227634 | 8/2000 |
| JP | A 2000-231166 | 8/2000 |

* cited by examiner

Primary Examiner—Hung Xuan Dang
(74) Attorney, Agent, or Firm—Oliff & Berridge, PLC

(57) ABSTRACT

In a light beam sensor (40) of a position adjuster, a light beam irradiated from a cross dichroic prism (150) is directly received by a CCD camera (41) via a beam splitter (451), so that the position adjuster can be adjusted without using a conventional projection screen and great size reduction of the position adjuster is possible, and, since only small space is required for installing the position adjuster, workspace can be efficiently utilized.

20 Claims, 21 Drawing Sheets

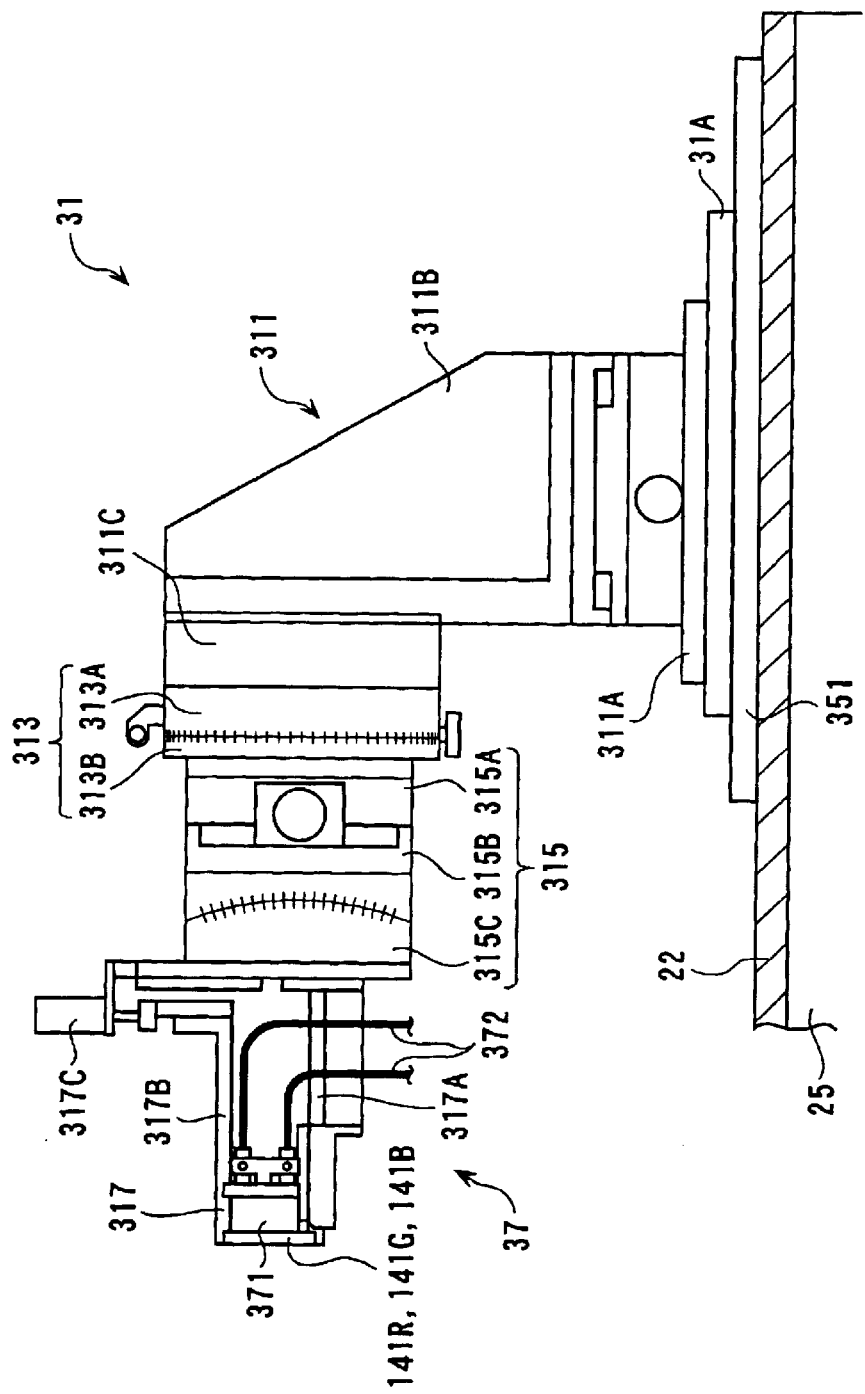

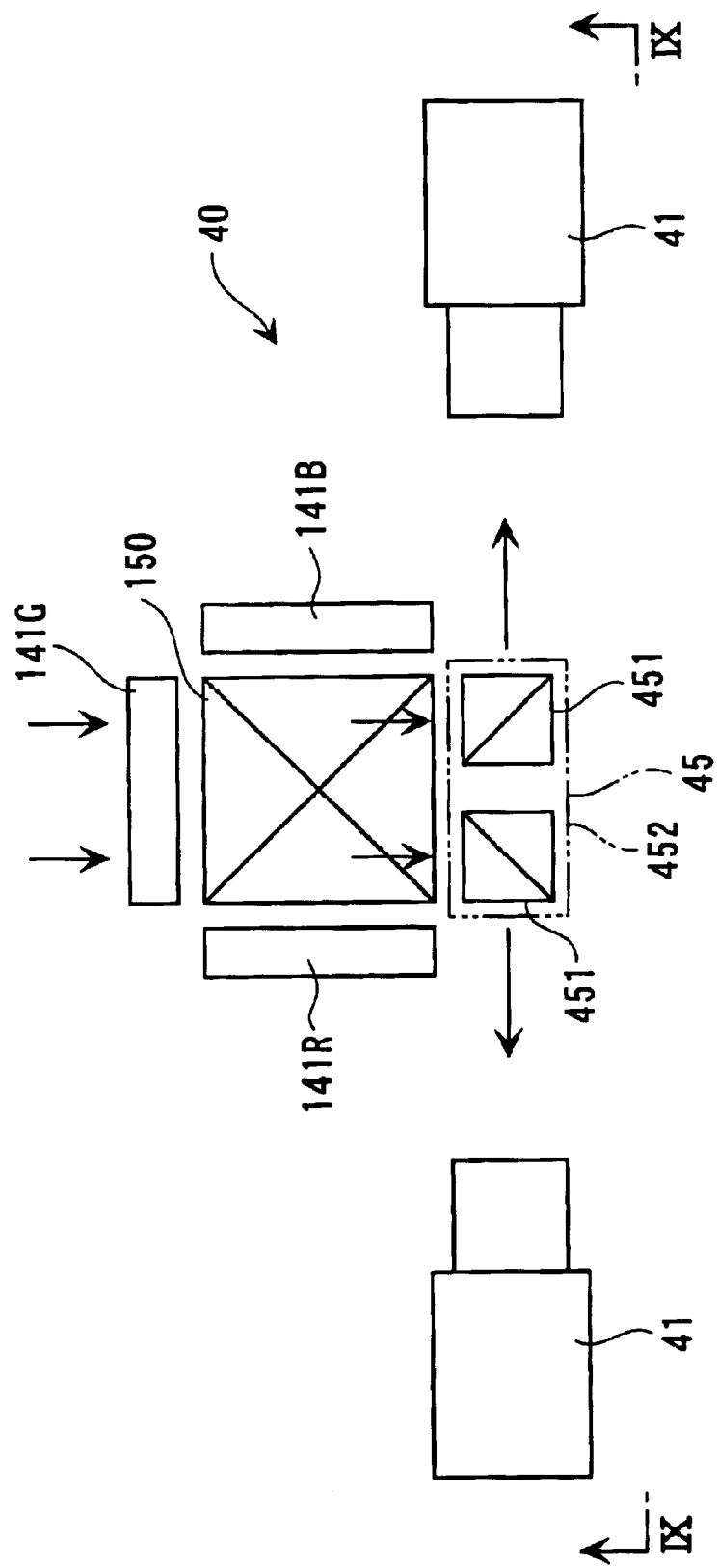

IX-IX

DEVICE AND METHOD FOR POSITIONAL ADJUSTMENT OF LIGHT MODULATOR

BACKGROUND OF THE INVENTION

1. Field of the Invention

The present invention relates to a position adjuster and a position adjusting method of an optical modulator for adjusting relative position of optical modulators used for producing a projector, the projector having a color separating optical system for separating a light beam irradiated by a light source into a plurality of color lights, a plurality of optical modulators for modulating the respective color lights separated by the color separating optical system in accordance with image information and a color combining optical system for combining the light beam modulated by the respective optical modulators.

2. Description of Related Art

Conventionally, a projector having a plurality of optical modulators (liquid crystal panels) for modulating a plurality of color lights respectively in accordance with image information, a color combining optical system (cross dichroic prism) for combining the color lights modulated by the respective optical modulators, and a projection optical system (projection lens) for enlarging and projecting the light beam combined by the color combining optical system to form a projected image has been used.

So-called three-plate projector is known as such projector, in which a light beam irradiated by a light source is separated into three color lights of red, green and blue by a dichroic mirror, the separated light beam is modulated for each color light in accordance with image information and the modulated light beam is combined by the cross dichroic prism to enlarge and project the color image through a projection lens.

In order to obtain a vivid projection image by the projector, it is necessary to prevent picture element deviation among the respective liquid crystal panels and distance gap from the projection lens, so that focus and alignment between the respective liquid crystal panels have to be adjusted with high accuracy in producing the projector.

The focus adjustment refers to adjustment for accurately locating the respective liquid crystal panels at a back focus position of the projection lens and the alignment adjustment refers to adjustment for coinciding the picture elements of the respective liquid crystal panels, which also apply in the following description.

The focus and alignment adjustment of the liquid crystal panel has been conventionally conducted by adjusting an optical unit including three liquid crystal panels, a cross dichroic prism and a projection lens, where (1) a light beam is irradiated on an image formation area of the respective liquid crystal panels, (2) the projected image passing through the cross dichroic prism and the projection lens is displayed on a screen, (3) the reflected light of the image projected on the screen is taken by a beam sensor such as a CCD camera fixed at a predetermined position and (4) the relative position of the respective liquid crystal panels is adjusted by a position adjusting mechanism while checking the focus, picture element position etc. of the respective liquid crystal panels detected by the CCD camera. In other words, the position of the respective liquid crystal panels has been adjusted based on the position of the image projected on the screen.

Conventionally, in order to project an image on a screen, an arrangement where an optical unit and a screen are disposed along an optical axis of a projection lens and the projected light from the optical unit is directly projected on the screen (conventional example 1) and another arrangement having a reflector for reflecting a light of a light source passing through a liquid crystal panel and a prism along a first direction into a second direction different from the first direction and a screen onto which the light of the light source reflected by the reflector along the second direction is projected (Japanese Patent Laid-Open Publication No. 2000-147654; conventional example 2) have been proposed.

However, according to the conventional example 1, since the image is projected on the screen and the optical unit and the screen are linearly disposed along the optical axis of the projection lens, large-size screen is necessary, thereby increasing the whole size of the device.

In the conventional example 2, though the size of the screen can be reduced-as compared to the conventional example 1 by reflecting the light projected by the projection lens with the reflector through a mirror, there is certain limit in size reduction of the whole device because of the use of the screen.

Accordingly, since the screen is necessary in both arrangements, large-scale device is necessary and solution thereof has been strongly desired.

SUMMARY OF THE INVENTION

An object of the present invention is to provide a position adjusting device and a position adjusting method of an optical modulator capable of greatly reducing the size of the whole device.

In order to achieve the above object, in the present invention, the relative position of the optical modulators is adjusted without using the screen that has been conventionally used.

Specifically, a position adjuster of an optical modulator of the present invention adjusts relative position of a plurality of optical modulators, the position adjuster being used for producing a projector having a color separating optical system that separates a light beam irradiated by a light source into a plurality of color lights, a plurality of optical modulators that modulates the respective color lights separated by the color separating optical system in accordance with image information, and a color combining optical system that combines the light beam modulated by the optical modulators, the position adjuster including a light beam sensor that directly receives a position-adjusting light beam irradiated by the optical modulator through the color combining optical system.

According to the present invention, since the light beam irradiated by the color combining optical system is directly received by the light beam sensor, no projection screen is required, thus greatly reducing entire size of the apparatus and achieving the above object.

In the position adjuster of an optical modulator according to the present invention, the light beam sensor may preferably include: a light guide that introduces the light beam irradiated by the color combining optical system in a predetermined direction; and an image sensor that receives the light beam guided by the light guide and converts the light beam into an electric signal.

According to the above arrangement, since the image sensor can be freely located by the provision of the light guide, the location efficiency of the respective components of the position adjuster of the optical modulator can be improved, thereby further enhancing size reduction of the position adjuster.

In the above arrangement, the light guide may preferably include a reflection mirror that reflects and refracts the light beam irradiated by the color combining optical system.

According to the above arrangement, since only the reflection mirror is required on the light beam emitting side of the color combining optical system, the arrangement of the light beam sensor can be simplified.

Alternatively, the light guide may preferably include an optical fiber that introduces the light beam irradiated by the color combining optical system to the image sensor.

According to the above arrangement, since the optical fiber is flexible, the freedom of location of the image sensor can be improved, thereby further enhancing size reduction of the position adjuster.

In the above, the light beam sensor may preferably include a light supply that supplies the position-adjusting light beam.

According to the above arrangement, since the light beam is not necessarily supplied from the incident-side of the optical modulator, light beam supply portion is not necessary to be provided on the mechanism used in adjusting position of the optical modulator, thereby simplifying the structure of the mechanism.

In the position adjuster of the present invention, the light beam sensor may preferably include a plurality of image sensors.

According to the above arrangement, when the focus and alignment of the optical modulator are adjusted, since the image of a plurality of picture element area can be taken, the adjustment can be conducted with high accuracy by adjusting the focus and alignment on all of the imaging areas.

In the above, the plurality of image sensors may preferably be correspondingly located on a diagonal line of a rectangular image formation area of the optical modulator.

Accordingly, when a plurality of components such as CCD camera including the image sensor and signal processor are provided, mutual interference can be avoided.

In the position adjuster according to the present invention, a position adjusting portion that holds the optical modulator and adjusts the position of the optical modulator relative to the color combining optical system may preferably be provided, the position adjusting portion being supported by a coarse focus adjusting mechanism that is moved toward and away from the color combining optical system.

According to the above arrangement, since the position adjusting portion is supported by the coarse focus adjusting mechanism, by locating the position adjusting portion at a predetermined position relative to the coarse focus adjusting mechanism, the optical modulator can be set at a designed predetermined position relative to the color combining optical system by moving the coarse focus adjusting mechanism by a predetermined distance from the condition holding the optical modulator by the position adjusting portion.

A position adjusting method of an optical modulator according to another aspect of the present invention uses the above-described position adjuster. Specifically, the position adjusting method of an optical modulator of the present invention adjusts relative position of a plurality of optical modulators, the position adjusting method being used for producing a projector including a color separating optical system that separates a light beam irradiated by a light source into a plurality of color lights, a plurality of optical modulators that modulates the respective color lights separated by the color separating optical system in accordance with image information, and a color combining optical system that combines the light beam modulated by the optical modulators, the position adjusting method including: a preliminary step that, based on a plurality of reference optical modulators and a reference color combining optical system of which relative position is adjusted in advance, sets a position of light beam sensor capable of receiving a light beam irradiated by the reference color combining optical system; a provision step that sets the color combining optical system relative to the light beam sensor; a detection step that introduces the light beam to the optical modulator to be adjusted for directly detecting the light beam irradiated via the color combining optical system by the light beam sensor; and a position adjusting step that adjusts the position of the optical modulator based on the detected light beam According to the above method, the light beam sensor can be set at an appropriate position based on the reference optical modulator and the reference color combining optical system by the preliminary step, and the position of the optical modulator can be adjusted without projecting the projection image on the screen by the provision step, detection step and position adjusting step. Accordingly, the size of the position adjuster required for adjustment work can be greatly reduced since the screen is not necessary, thereby achieving the above object.

In the position adjusting method of an optical modulator according to the present invention, the detection step and the position adjusting step may preferably be continuously conducted for every optical modulator.

Accordingly, the light beam sensor can be commonly used by the respective optical modulators, so that the adjustment can be conducted with a small number of light beam sensor.

In the position adjusting method of an optical modulator according to the present invention, the preliminary step may preferably have an initial setting step where a position of a position adjusting portion that adjusts the position of the optical modulator at a designed predetermined position relative to the coarse focus adjusting mechanism moving toward and away from the color combining optical system.

According to the above method, since the preliminary step has the initial setting step, by locating the optical modulator on the position adjusting portion before or after the initial setting step, the position adjuster can be located at a predetermined position relative to the coarse focus adjusting mechanism by the initial setting step, so that the optical modulator can be located at a designed predetermined position relative to the color combining optical system by moving the coarse focus adjusting mechanism relative to the color combining optical system by a predetermined distance.

Accordingly, the position adjustment of the optical modulator during the position adjusting step can be simplified, thereby reducing the cycle time.

Further, in the position adjusting method of an optical modulator according to the present invention, the position adjusting step may preferably include a focus adjusting process where advancement and retraction positions relative to the color combining optical system are adjusted and an alignment adjusting process where the mutual position of respective optical modulators is adjusted.

According to the above method, since the position adjusting step includes the focus adjusting process and the alignment adjusting process, the planar position, the in-plane rotary position and the out-plane rotary position of the optical modulator can be adjusted while the advancement and retraction position of the optical modulator relative to the color combining optical system are adjusted.

Therefore, the optical modulator can be located at a desired position relative to the color combining optical system by locating the optical modulator at the back focus position of the projection lens and adjusting the mutual position of the respective optical modulators.

In the position adjusting method of an optical modulator according to the present invention, the focus adjusting process may preferably include a coarse adjusting step where the focus of the optical modulator is adjusted by advancing and retracting a coarse focus adjusting mechanism that moves the optical modulator toward and away from the color combining optical system, and a minute adjusting step by the position adjusting portion that adjusts the position of the optical modulator.

According to the above method, since the focus adjusting step includes the coarse adjusting step and the minute adjusting step, the movement range of the optical modulator can be set wide by adjusting the movement of the optical modulator so that the optical modulator is moved in the range of millimeter to centimeter order during the coarse adjusting step and is moved in the range of micrometer to millimeter order during the minute adjusting step, thereby easily and rapidly adjusting the position of the optical modulator.

In the position adjusting method of an optical modulator according to the present invention, the position of the optical modulator may preferably be successively adjusted for a plurality of projectors, the method comprising a type determining step in which whether the same type of projectors are successively produced or not is determined, where the initial setting step is omitted when the type of the projectors are determined to be the same in the type determining step.

When the position of the optical modulators is successively adjusted for a plurality of projectors, the initial setting step can be omitted for the projector produced after the first projector by adjusting the position of the optical modulator relative to the color combining optical system based on the initial position set during the initial setting step established in producing the first projector.

Similarly, the coarse adjusting step can be omitted for the projector produced after the first projector by holding the focus position established in the coarse adjusting step in producing the first projector and adjusting the position with the focus position as the initial position.

In the present arrangement, when a plurality of projectors are produced and the position of a plurality of optical modulators is successively adjusted relative to the color combining optical system, whether the same model is successively produced or not is determined by the model determining step and the initial setting step and/or the coarse adjusting step is omitted when production of the same model is determined, so that excessive process in successively producing the same model can be omitted.

Accordingly, the cycle time for producing the projector can be reduced and the position of a plurality of optical modulators can be successively and smoothly conducted in accordance with a plurality of projectors.

BRIEF DESCRIPTION OF THE DRAWINGS

FIG. 6 is a side elevational view showing a position adjusting mechanism of the position adjuster according to the aforesaid respective embodiments;

FIG. 8 is a plan view schematically showing a light beam sensor of the position adjuster according to the aforesaid respective embodiments;

DETAILED DESCRIPTION OF PREFERRED EMBODIMENT(S)

An embodiment of the present invention will be described below with reference to attached drawings.

[1. Structure of Projector to Which Lens Array is Applied]

Figure 1:
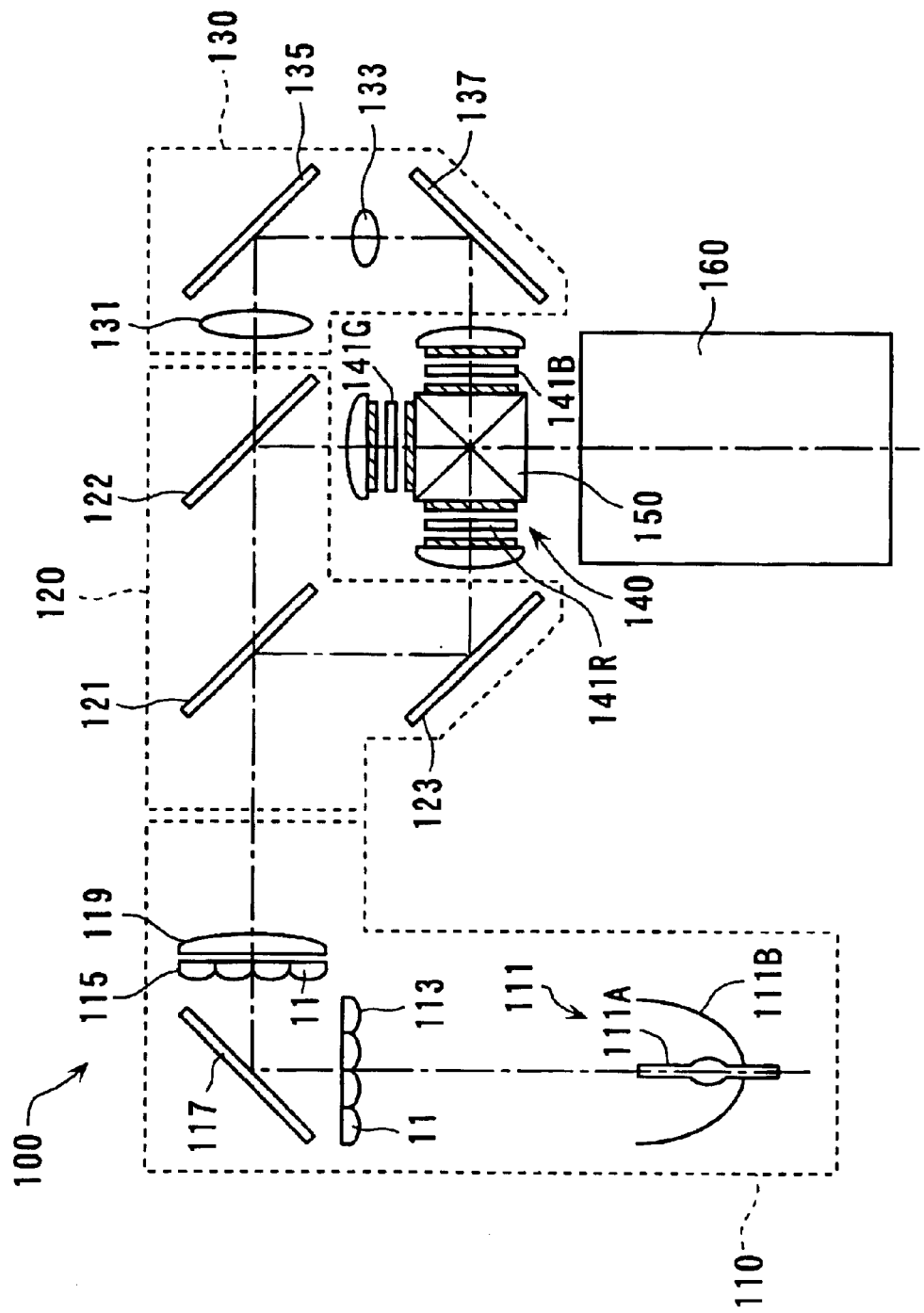
FIG. 1 is a schematic illustration showing a structure of a projector including an optical modulator to be adjusted by a position adjuster according to respective embodiments of the present invention.

FIG. 1 shows a structure of a projector 100 including a plurality of optical modulators to be adjusted by the position adjuster according to an embodiment of the present invention and a color combining optical system.

The projector 100 includes an integrator illumination optical system 110, a color separating optical system 120, a relay optical system 130, an electric optical device 140, a cross dichroic prism 150 as a color combining optical system and a projection lens 160.

The integrator illuminating optical system 110 has a light source 111 including a light source lamp 111A and a reflector 111B, a first lens array 113, a second lens array 115, a reflection mirror 117 and a superimposing lens 119. The irradiating direction of the light beam irradiated by the light source lamp 111A is aligned by the reflector 111B and the light beam is separated into a plurality of sub-beams by the first lens array 113. After the irradiating direction of the light beam is bent by the reflection mirror 117 for ninety degrees, the light beam focuses around the second lens array 115. The respective sub-beams irradiated by the second lens array 115 are incident on the incident surface of the subsequent superimposing lens 119 so that the central axis (main beam) thereof becomes perpendicular thereto. Further, the plurality of sub-beams irradiated by the superimposing lens 119 are superimposed on three liquid crystal panels 141R, 141G and 141B constituting below-described electric optical device 140. The color separating optical system 120 has two dichroic mirrors 121 and 122 and a reflection mirror 123, the dichroic mirrors 121 and 122 and the reflection mirror 123 separating the plurality of sub-beams irradiated by the integrator illuminating optical system 110 into three color lights of red, green and blue.

The relay optical system 130 includes an incident-side lens 131, a relay lens 133 and reflection mirrors 135 and 137, which introduces the color light separated by the color separating optical system 120, for instance, blue light B, to the liquid crystal panel 141B.

The electric optical device 140 has the liquid crystal panels 141R, 141G and 141B as three optical modulators, which use, for instance, polysilicon TFT as a switching element. The respective color lights separated by the color separating optical system 120 are modulated by the three liquid crystal panels 141R, 141G and 141B in accordance with image information to form an optical image.

The cross dichroic prism 150 as a color combining optical system combines images modulated for every color light irradiated by the three liquid crystal panels 141R, 141G and 141B to form a color image. Incidentally, in the cross dichroic prism 150, dielectric multi-layer film for reflecting red light and a dielectric multi-layer film for reflecting blue light are formed in approximate X-shape along a border of four right-angle prisms, the dielectric multi-layer film combining the three color lights. The color image combined by the cross dichroic prism 150 is irradiated by the projection lens 160 and is enlarged and projected on the screen.

[2. Structure of Optical Unit]

Figure 2:
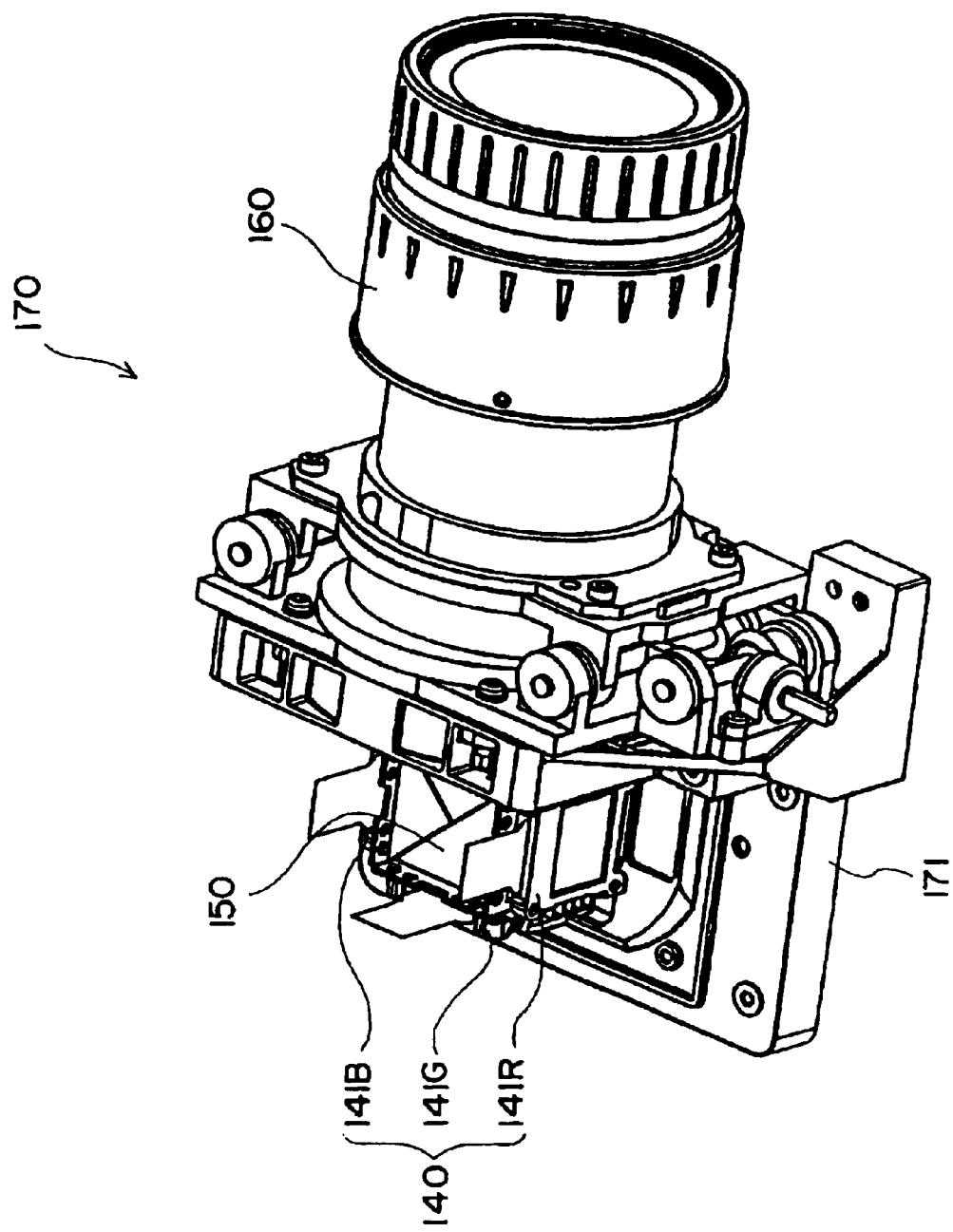
FIG. 2 is an exterior perspective view showing a structure of a primary portion of a projector according to the respective embodiments.

In such projector 100, the electric optical device 140, the cross dichroic prism 150 and the projection lens 160 are integrated as an optical unit 170. Specifically, as shown in FIG. 2, the optical unit 170 has a head 171 as a L-shaped side assembly made of magnesium alloy etc.

The projection lens 160 is fixed by a screw on an outside of L-shaped perpendicular surface of the head 171. The cross dichroic prism 150 is also fixed by a screw on the L-shaped horizontal surface of the head 171.

Figure 3:
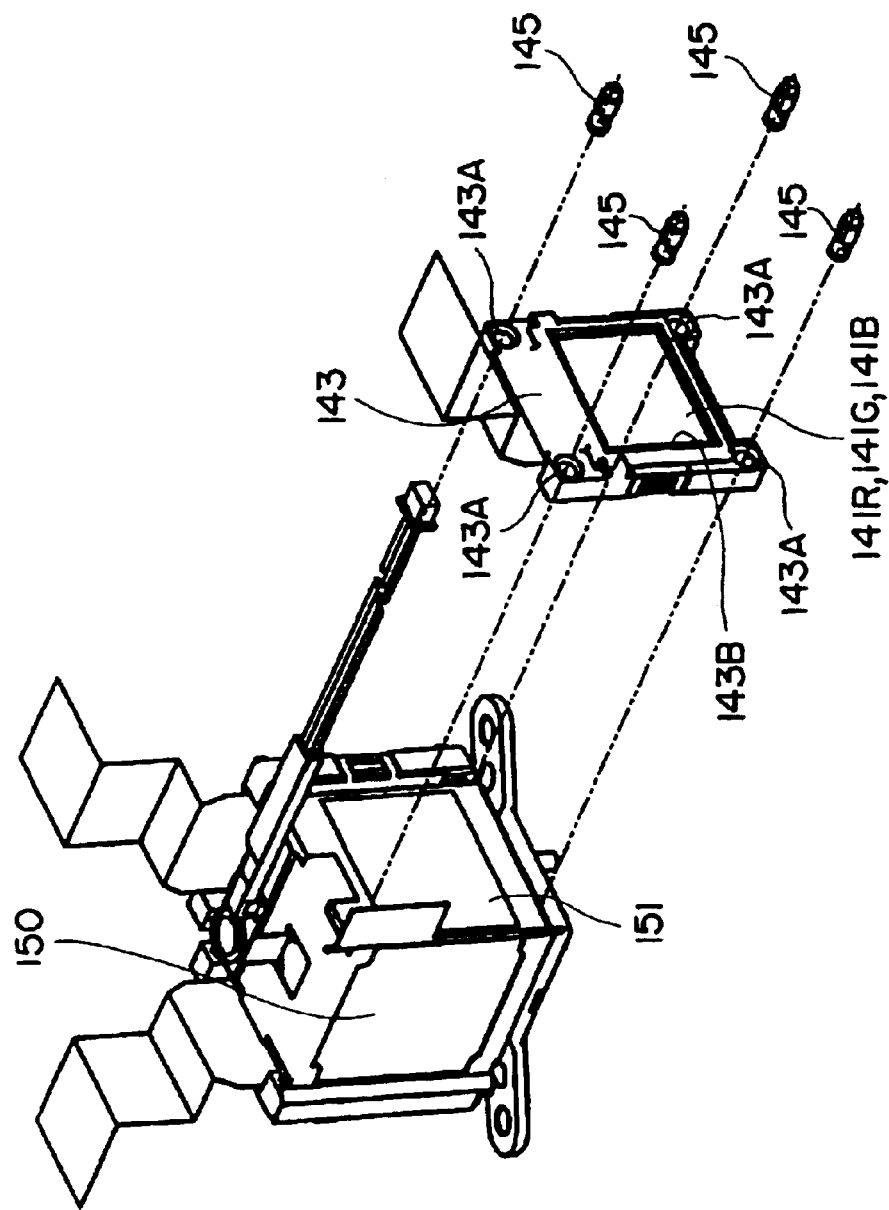
FIG. 3 is an exploded perspective view showing an optical modulator to be adjusted of the aforesaid respective embodiments.

The three liquid crystal panels 141R, 141G and 141B constituting the electric optical device 140 surround the three sides of the cross dichroic prism 150. Specifically, as shown in FIG. 3, the respective liquid crystal panels 141R, 141G and 141B are accommodated in a holding frame 143 and are fixed on the cross dichroic prism 150 by a POP (Panel On Prism) structure where the liquid crystal panels are adhered and fixed on a beam-incident end surface 151 of the cross dichroic prism 150 by inserting a transparent resin pin 145 to a hole 143A formed on four corners of the holding frame 143 together with an ultraviolet curing adhesive. A rectangular opening 143B is formed on the holding frame 143 through which the respective liquid crystal panels 141R, 141G and 141B are exposed to form an image formation area. In other words, the respective color lights R, G and B are introduced to the exposed part of the respective liquid crystal panels 141R, 141G and 141B to form an optical image in accordance with image information.

According to the optical unit 170 employing such POP structure, since the focus adjustment, alignment adjustment and fixing process of the respective liquid crystal panels 141R, 141G and 141B have to be simultaneously conducted (within approximately eight minutes) in adhering and fixing the liquid crystal panels 141R, 141G and 141B to the cross dichroic prism 150, assembly process is usually conducted as follows.

1) First liquid crystal panel, the liquid crystal panel 141G for instance, is adhered and fixed on the cross dichroic prism 150. Specifically, the pin 145 coated with ultraviolet curing adhesive at a distal end thereof is inserted to the hole 143A of the holding frame 143 of the liquid crystal panel 141G.
2) Subsequently, the distal end of the pin 145 is abutted to the beam-incident end surface 151 of the cross dichroic prism 150.
3) The light beam is introduced to the image formation area of the liquid crystal panel 141G in the above condition, and while directly checking the light beam irradiated by the cross dichroic prism 150, advancement and retraction position, planar position and rotary position relative to the beam-incident end surface 151 are adjusted to adjust focus and alignment of the liquid crystal panel 141G.
4) When desired focus and alignment are obtained, fixing light beam, i.e. ultraviolet, is irradiated from a base end of the pin 145, thereby completely curing the ultraviolet curing adhesive.
5) The other liquid crystal panels 141R and 1411B are adhered and fixed in the same manner as the above.

Accordingly, in order to assemble the optical unit 170 using such POP structure, a position adjuster for adjusting relative focus and alignment of the respective liquid crystal panels 141R, 141G and 1411B is necessary.

[3. Structure of Position Adjuster of Optical Modulator]

Figure 4:
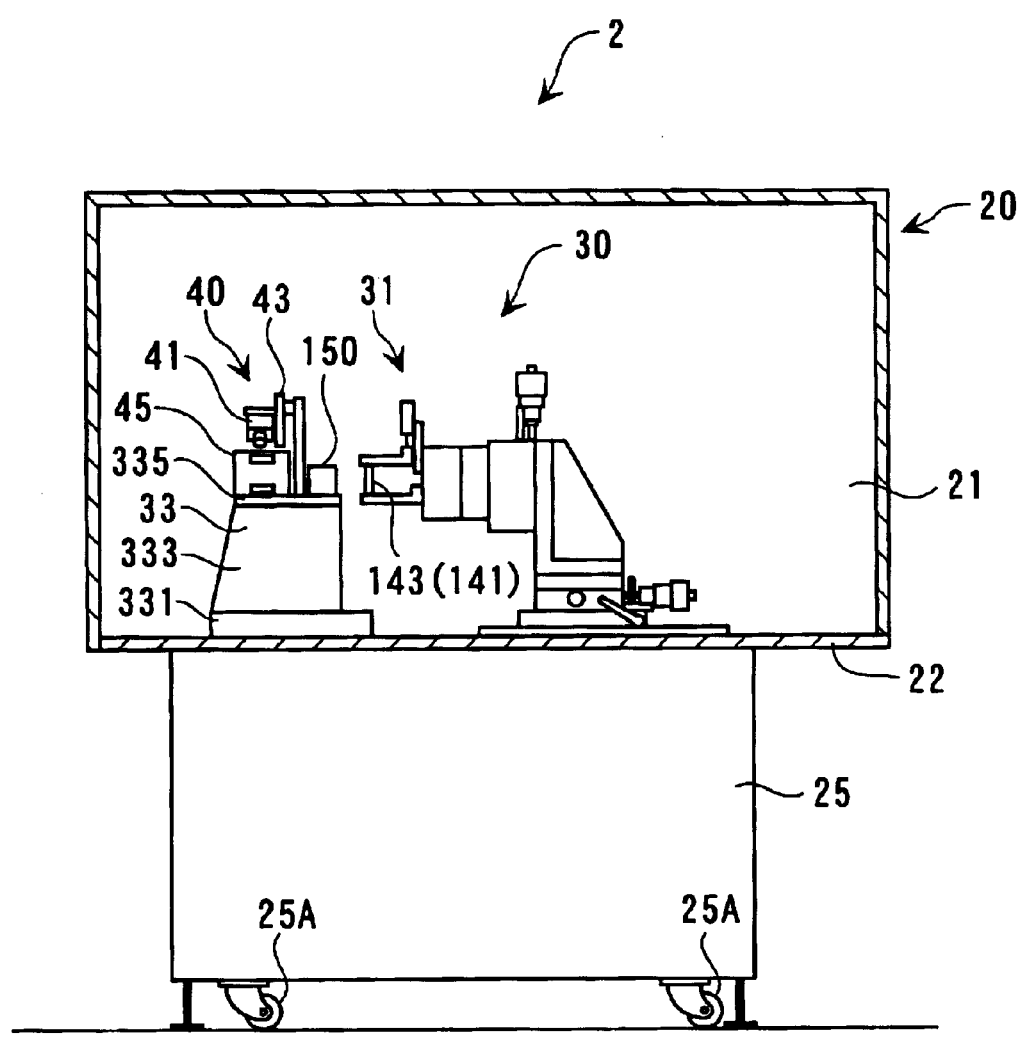
FIG. 4 is a side elevational view showing a position adjustor of the aforesaid respective embodiments.
Figure 5:
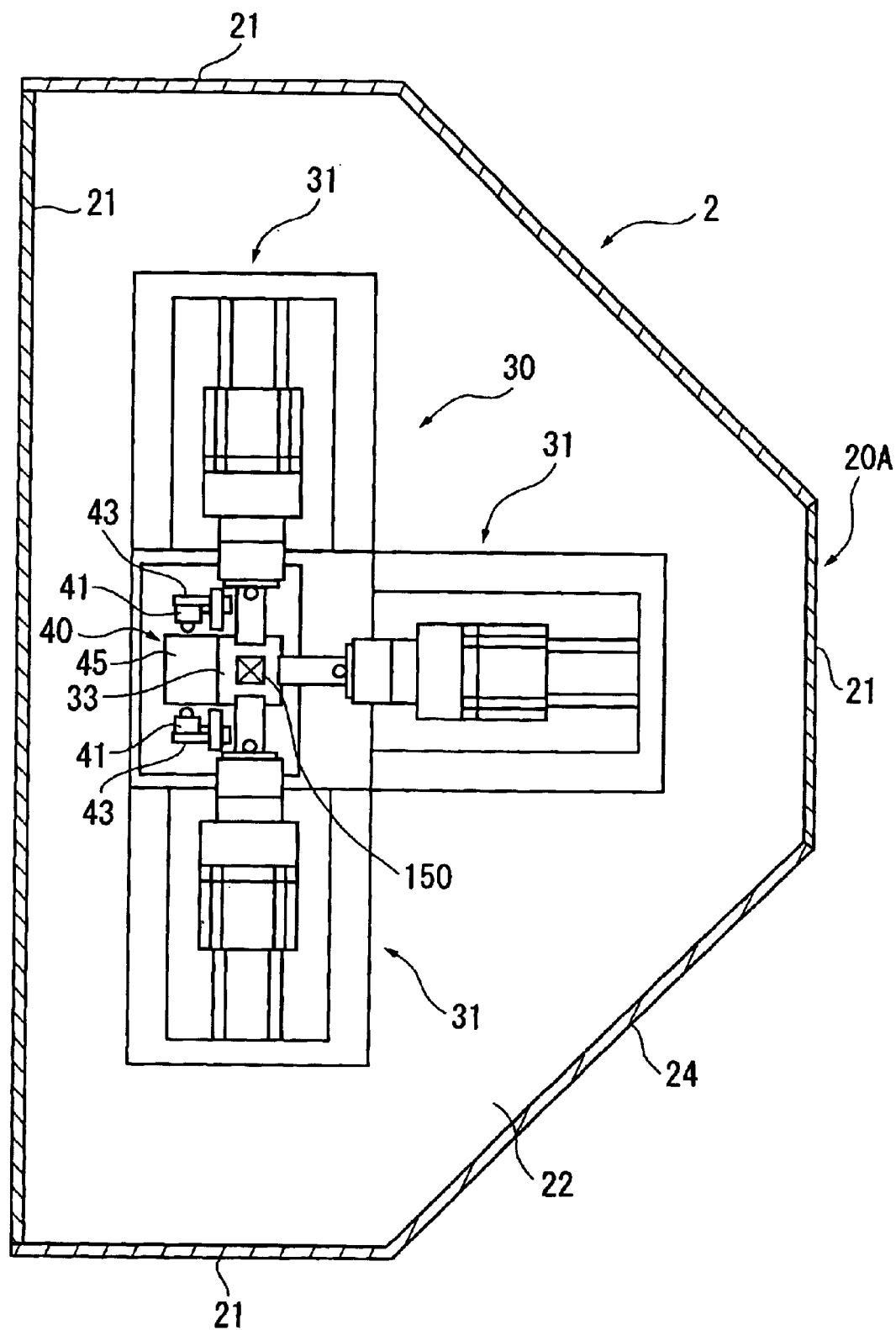
FIG. 5 is a plan view showing a position adjuster according to the aforesaid respective embodiments.

A position adjuster 2 for adjusting the position of the respective liquid crystal panels 141R, 141G and 141B is shown in FIGS. 4 and 5. The position adjuster 2 is composed of a UV light-shield cover 20, an adjuster body 30, a light beam sensor 40, a computer 70 (FIG. 10), an adjusting light source (not shown) and a fixing ultraviolet light source (not shown).

The UV light-shield cover 20 has a side plate 21 surrounding an upper part of the adjuster body 30, a bottom plate 22, and a platform 25 provided below. Incidentally, an openable and closable door (not shown) is provided on the side plate 21 which is used for supplying and removing the POP adjustment workpiece and for adjusting the adjuster body 30 and is formed by an acrylic plate that transmits no ultraviolet. The platform 25 is provided with a castor 25A on the lower side thereof so that the adjuster body 30 can be easily moved in installing the device.

The computer 70 controls the adjuster body 30, the light beam sensor 40, the adjusting light source and the fixing ultraviolet light source and is disposed in the platform 25.

The adjusting light source is a light source of a position-adjusting light beam used in adjustment work in the adjuster body 30.

The fixing ultraviolet light source is a light source of light beam (ultraviolet) used for curing ultraviolet adhesive in fixing the liquid crystal panels 141R, 141G and 1411B on the cross dichroic prism 150.

(3-1) Structure of Adjuster Body

The adjuster body 30 is composed of a six-axis position adjusting unit 31 as a position adjusting portion, a support jig 33 for supporting and holding the cross dichroic prism 150 and a light source unit 37 (FIG. 6) for introducing the light beam from the adjusting light source and the fixing ultraviolet light source into the liquid crystal panels 141 (141R, 141G, 141B).

The six-axis position adjusting unit 31 adjusts the location of the liquid crystal panels 141R, 141G and 141B relative to the light beam-incident end surface 151 of the cross dichroic prism 150, which is supported by a six-axis position adjusting unit moving mechanism 31A movably set along a rail 351 of the bottom plate 22 of the UV light-shielding cover 20 as shown in FIG. 6.

The six-axis position adjusting unit moving mechanism 31A supports the six-axis position adjusting unit 31 and moves the unit in Z-axis direction of the platform 25 (right and left direction in FIG. 6) within a range of millimeter to centimeter order by a drive mechanism such as a motor (not shown).

The six-axis position adjusting unit 31 has a planar position adjuster 311 supported by the six-axis position adjusting unit moving mechanism 31A, an in-plane rotary position adjuster 313 provided at a distal end of the planar position adjuster 311, an out-plane rotary position adjuster 315 provided at a distal end of the in-plane rotary position adjuster 313 and a liquid crystal panel holder 317 provided at a distal end of the out-plane rotary position adjuster 315.

The planar position adjuster 311 adjusts the advancement and retraction position and planar position relative to the light beam-incident end surface 151 of the cross dichroic prism 150, which includes a base 311A slidably provided on the six-axis position adjusting unit 31A, a leg 311B vertically mounted on the base 311A, and a connector 311C provided on the upper distal portion of the leg 311B for the in-plane rotary position adjuster 313 to be connected. The base 311A moves in Z-axis direction (right and left direction in FIG. 6) of the platform 25 within a range of micrometer to millimeter order by a drive mechanism such as a motor (not shown). The leg 311B moves in X-axis direction (a direction orthogonal with paper surface of FIG. 6) relative to the base 311A by a drive mechanism such as a motor (not shown) provided on a side thereof. The connector 311C moves in Y-axis direction (up and down direction in FIG. 6) relative to the leg 311B by a drive mechanism such as a motor (not shown).

The in-plane rotary position adjuster 313 adjusts the in-plane rotary position of the liquid crystal panels 141R, 141G and 141B relative to the light beam-incident end surface 151 of the cross dichroic prism 150, which includes a cylindrical base 313A fixed to a distal end of the planar position adjuster 311 and a rotation adjuster 313B rotatable in the circumferential direction of the base 313A. By adjusting the rotary position of the rotation adjuster 313B, the in-plane rotary position of the liquid crystal panels 141R, 141G and 141B relative to the light beam-incident end surface 151 can be adjusted with high accuracy.

The out-plane rotary position adjuster 315 adjusts the out-plane rotary position of the liquid crystal panels 141R, 141G and 141B relative to the light beam-incident end surface 151 of the cross dichroic prism 150. The out-plane rotary position adjuster 315 has a base 315A fixed to a distal end of the in-plane rotary position adjuster 313 and provided with a concave curved surface having horizontally extending arc, a first adjuster 315B slidable along the concave curved surface of the base 315A and provided with a concave curved surface having perpendicularly extending arc, and a second adjuster 315C slidable along the arc on the curved surface of the first adjuster 315B. When the motor (not shown) provided on the side of the base 315A is rotated, the first adjuster 315B is slid. When the motor (not shown) provided on the upper side of the first adjuster 315B is rotated, the second adjuster 315C is slid, so that the out-plane rotary position of the liquid crystal panels 141R, 141G and 141B relative to the light beam-incident end surface 151 can be adjusted with high accuracy.

The liquid crystal panel holder 317 holds the liquid crystal panels 141R, 141G and 141B to be adjusted and includes a fixed holding piece 317A fixed at a distal portion of the second adjuster 315C, a movable holding piece 317B slidable at a distal portion of the second adjuster 315C, and an actuator 317C for moving the movable holding piece 317B. The liquid crystal panels 141R, 141G and 141B can be held by moving the movable holding piece 317B by the actuator 317C. Further, by changing initial slide position of the movable holding piece 317B, the liquid crystal panels 141R, 141G and 141B of different size can be held.

As shown in FIG. 4, the support jig 33 has a base plate 331 provided on the bottom plate 22, a leg 333 vertically mounted on the base plate 331 and a set plate 335 provided on an upper part of the leg 333 for the cross dichroic prism 150 and below-described light guide 45 to be attached.

The light source unit 37 is disposed between the fixed holding piece 317A and the movable holding piece 317B of the liquid crystal panel holder 317 provided to the six-axis position adjusting unit 31.

The light source unit 37 supplies position-adjusting light beam and fixing light beam to the liquid crystal panels 141R, 141G and 141B, which includes a unit body 371 to be in contact with the liquid crystal panels 141R, 141G and 141B, and four optical fibers 372 for supplying the light from the respective light sources to the unit body 371.

Figure 7A:
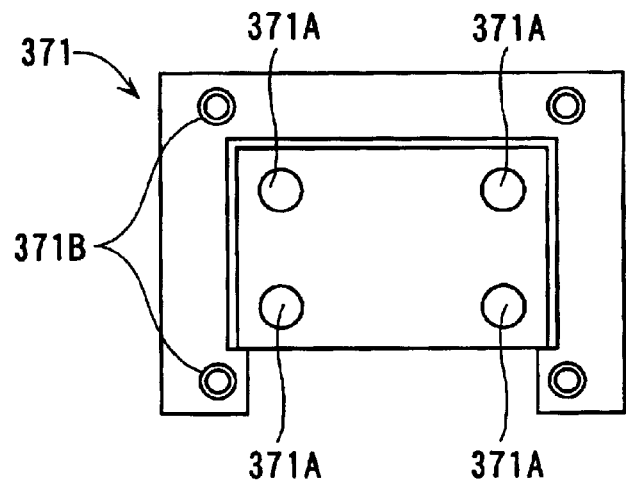
FIGS. 7(A), (B), (C) are front elevational views showing a portion to be irradiated by an adjusting light source according to the aforesaid respective embodiments.
Figure 7B:
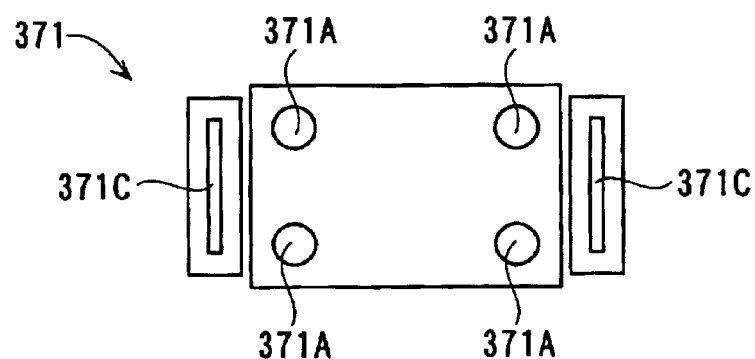
Figure 7C:
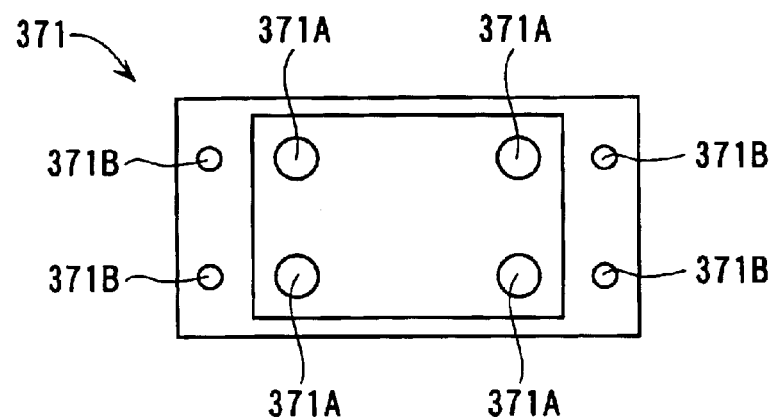

The base end of the optical fiber 372 is connected to the adjusting light source and fixing light source provided on a lower part of the platform 25. As shown in FIG. 7(A), adjusting light source portion 371A located corresponding to corners of the rectangular image formation area of the liquid crystal panels 141R, 141G and 141B and a fixing light source portion 371B located outside the image formation area to be in contact with the base end of the transparent resin pin 145 are provided on the contact surface between the unit body 371 and the liquid crystal panels 141R, 141G and 141B. Incidentally, the unit body 371 to be in contact with the liquid crystal panels 141R, 141G and 141B may have arrangement different from that shown in FIG. 7(A), where the fixing light source portion 371C is disposed along the outer side portion of the adjusting light source portion 371A as shown in FIG. 7(B) or the fixing light source portion 371B may be differently arranged as shown in FIG. 7(C). The arrangement of the unit body 371 may be changed in accordance with the type of the liquid crystal panels 141R, 141G and 141B, thereby being suitably used for liquid crystal panel of different fixing structure.

(3-2) Structure of Light Beam Sensor

As shown in FIG. 4, the light beam sensor 40 has a CCD camera 41, a moving mechanism 43 adapted to move the CCD camera 41 three-dimensionally, and a light guide 45 attached on the support jig 33.

The CCD camera 41 is an area sensor having charge coupled device as an image sensor of the present invention, which receives position-adjusting light beam irradiated by the cross dichroic prism 150 to output as an electric signal.

Figure 9:
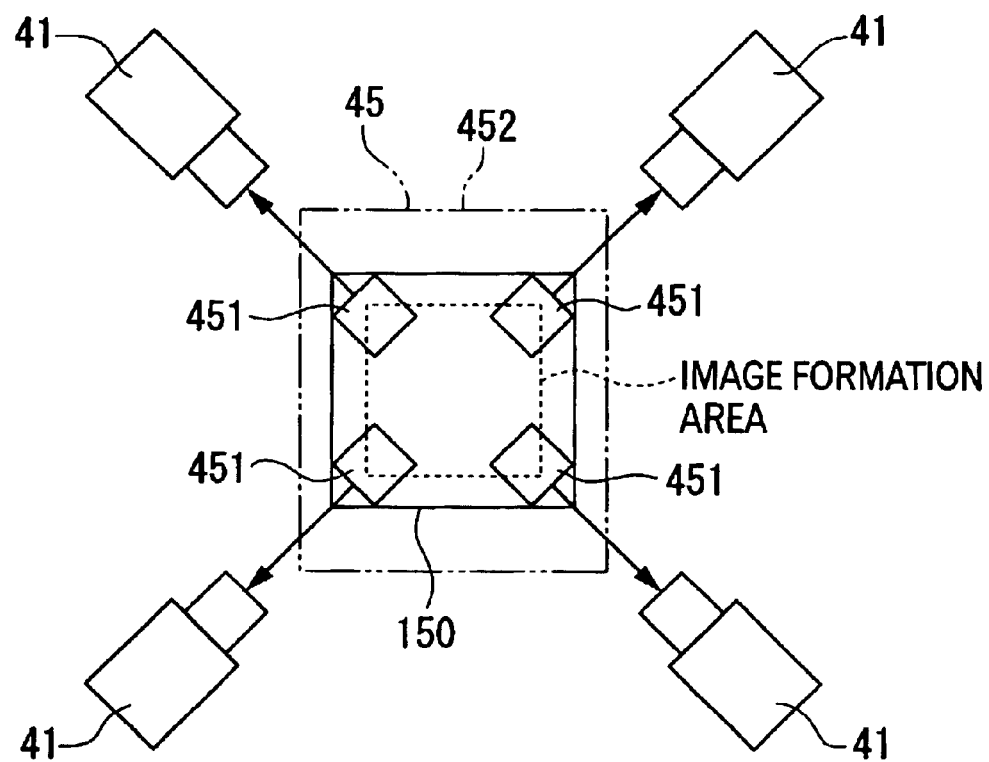
FIG. 9 is a front elevational view schematically showing a light beam sensor of the position adjuster according to the aforesaid respective embodiments seen from IX-IX line of FIG. 8.

As schematically shown in FIGS. 8 and 9, four CCD cameras 41 are disposed in four directions of the light guide 45 through the moving mechanism 43 (FIG. 4) in the present embodiment. The respective CCD cameras 41 are correspondingly located on diagonal line of the rectangular image formation area formed on the liquid crystal panels 141R, 141G and 141B. Incidentally, the CCD camera 41 has zooming and focusing mechanism for detecting the projected image with high accuracy, whereby the zooming and focusing can be more freely adjusted by remote control.

Though not specifically shown, the moving mechanism 43 includes a column vertically mounted on the base plate 331 of the support jig 33, a plurality of shaft members provided on the column, camera attachment provided on one of the shaft members, and can move the CCD camera 41 in both X-axis direction (right and left directions in FIG. 9) and Y-axis direction (up and down directions in FIG. 9). The movement is effected by a servo control mechanism inside the platform 25.

The light guide 45 is composed of four beam splitters 451 as reflection mirror disposed corresponding to four corners of the rectangular image formation area of the liquid crystal panels 141R, 141G and 141B and a holding cover 452 for holding the respective beam splitters 451 at a predetermined position. The light guide 45 refracts the light beam on four corners irradiated from the cross dichroic prism 150 after being irradiated from the light source unit 37 to the liquid crystal panels 141R, 141G and 141B by ninety degrees with the respective beam splitters 451, and, subsequently, introduces the light beam into the CCD camera 41. Incidentally, the holding cover 452 is provided with an opening for transmitting the light refracted to the outside. In FIG. 8, the light beam is irradiated on the liquid crystal panel 141G.

According to the light guide 45, the light beam on four corners irradiated by the cross dichroic prism 150 is directly received by the CCD cameras 41 located in four directions without being projected on the screen as in the conventional arrangement.

[4. Adjusting Operation by Position Adjuster]

Figure 10:
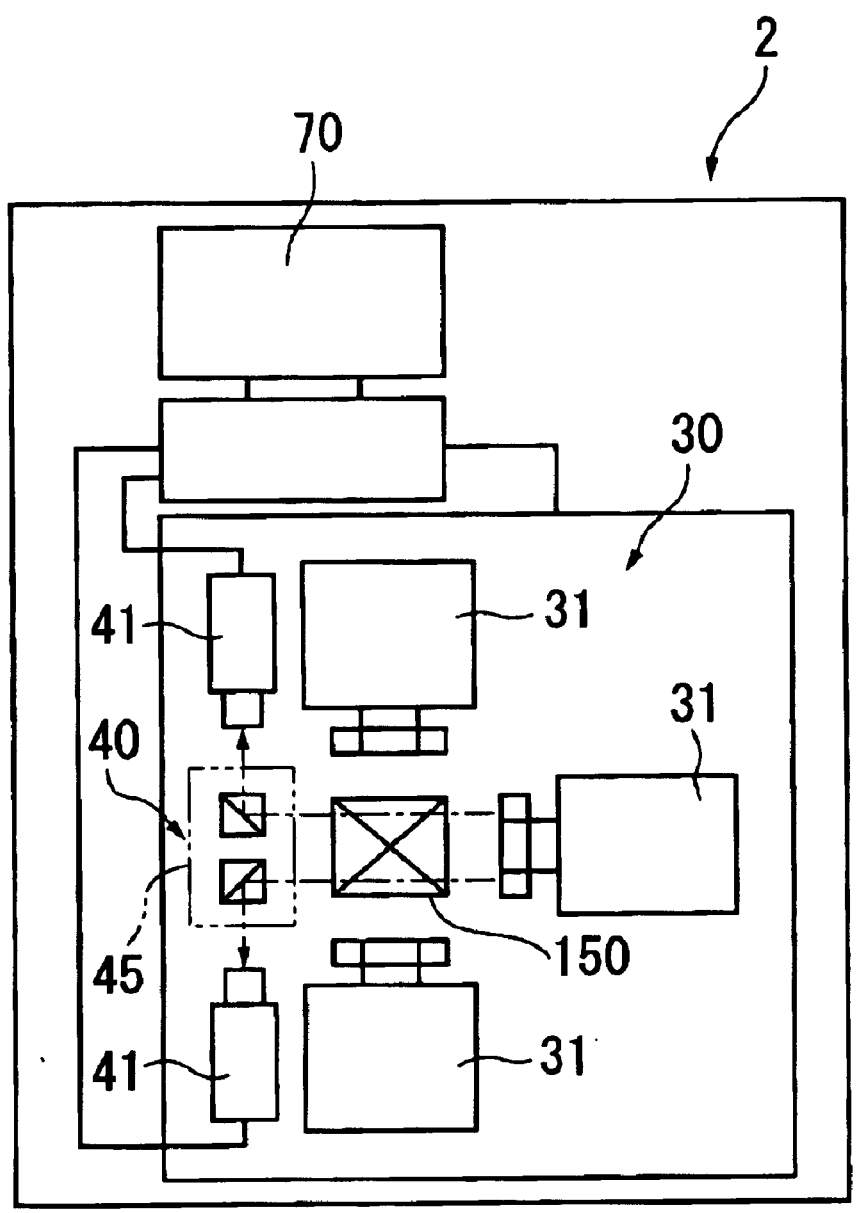
FIG. 10 is a block diagram showing a structure of an inside of a computer for controlling the position adjuster of the aforesaid respective embodiments.

The above-described adjuster body 30 and the light beam sensor 40 are electrically connected to the computer 70 as shown in block diagram of FIG. 10.

The computer 70 has a CPU and a storage device, which controls the operation of the adjuster body 30 and the light beam sensor 40 and processes the projected image taken by the CCD camera 41 of the light beam sensor 40.

Figure 11:
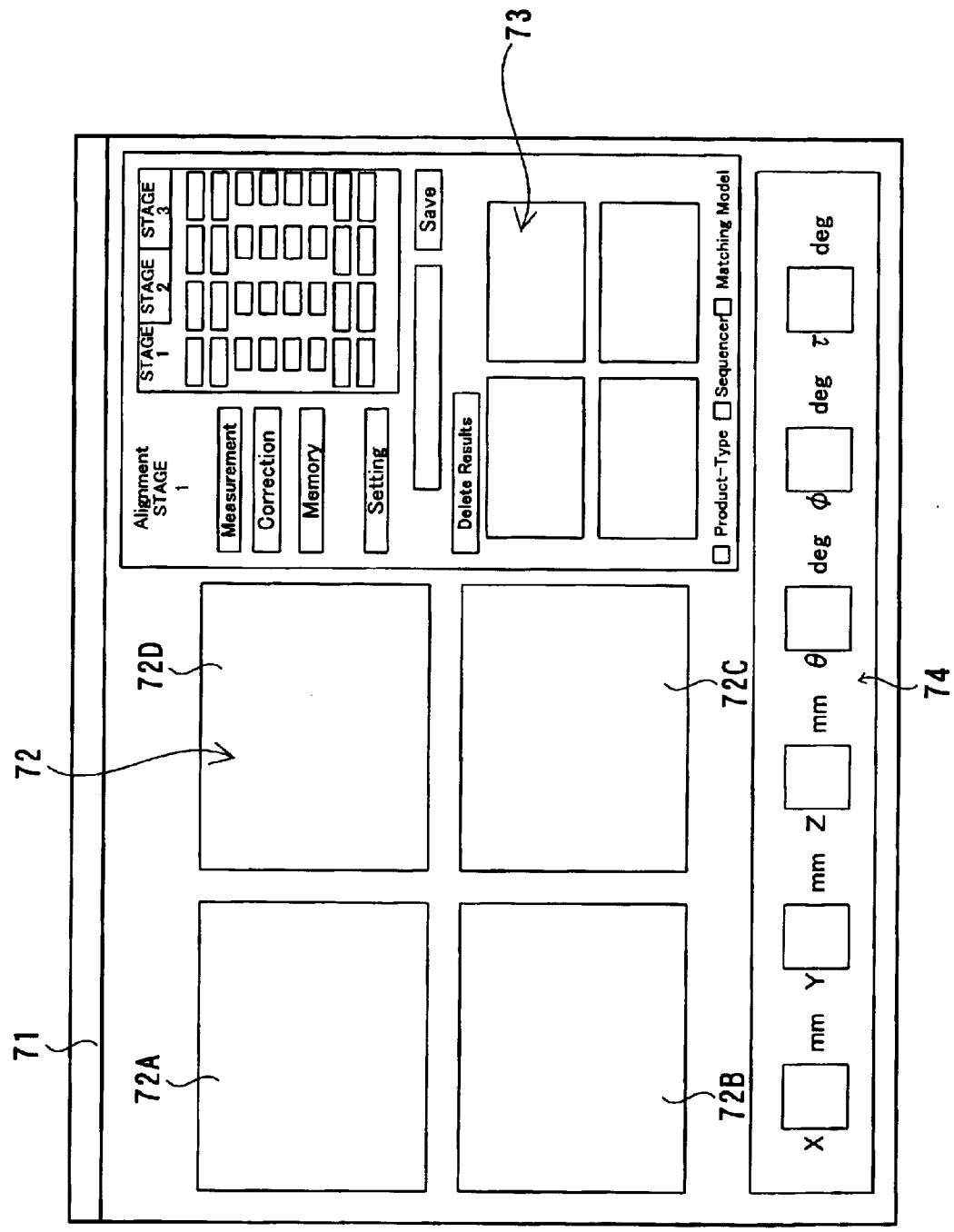
FIG. 11 is an illustration showing a display screen for displaying a fetched image of the aforesaid respective embodiments.

The program called by the computer 70 displays a display screen 71 shown in FIG. 11 on the display, and the focus and alignment are adjusted based on various information displayed on the display screen 71. The display screen 71 includes an image display view 72 for directly displaying the image from the CCD camera 41, an image processing view 73 for conducting pattern-matching processing of the image displayed on the image display view 72 based on reference pattern image, and an axis movement display view 74 for displaying adjustment amount of the respective axes of the six-axis position adjusting unit 31 after image processing. Incidentally, the images obtained by the light beam on four corners respectively received by the four CCD cameras 41 are displayed on respective image display areas 72A to 72D of the image display view 72.

Figure 12:
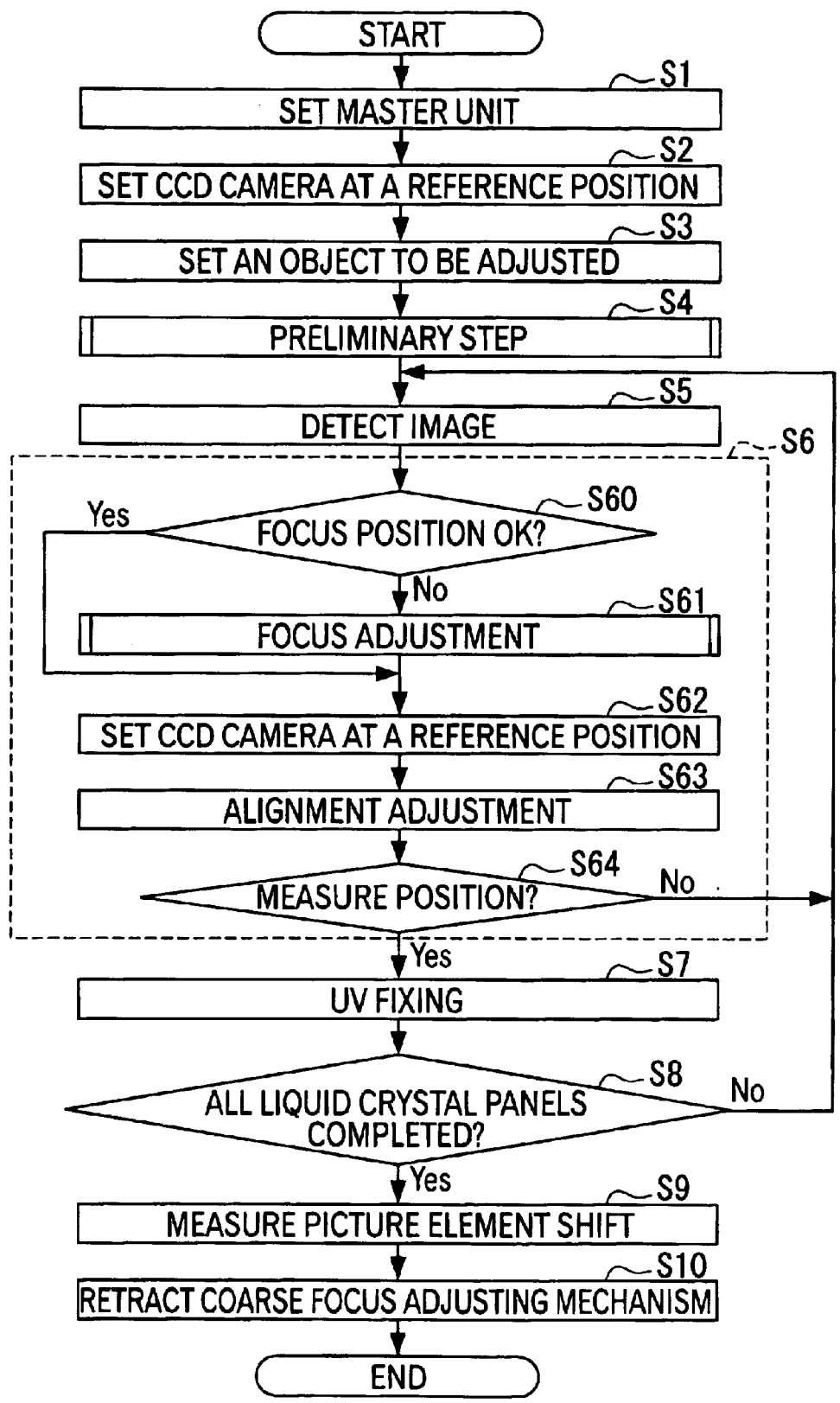
FIG. 12 is a flowchart for explaining a position adjusting method of the aforesaid respective embodiments.

Next, position adjusting method of the liquid crystal panels 141R, 141G and 141B by the position adjuster 2 will be described below with reference to flowchart shown in FIG. 12.

S1: Initially, a master unit having POP structure with the focus position and alignment position thereof being adjusted in advance in accordance with the characteristics of the projection lens 160 for each model and the light guide 45 with the location of the beam splitter 451 being determined in accordance with the size of the image formation area of the master unit are set to the support jig 33. The master unit is a reference cross dichroic prism as a reference color combining optical system integrated with three reference liquid crystal panels for respective color lights as reference optical modulators.

S2: Next, position-adjusting light beam is irradiated on the reference liquid crystal panel of the master unit for green color light from the light source unit 37 and the light beam irradiated by the master unit is directly received by the CCD camera 41 through the beam splitter 451. At this time, the moving mechanism 43 is driven to move the CCD camera 41 to a position capable of securely receiving the light beam. The image at this time is displayed on the respective image display areas 72A to 72D of the image display view 72.

Figure 13:
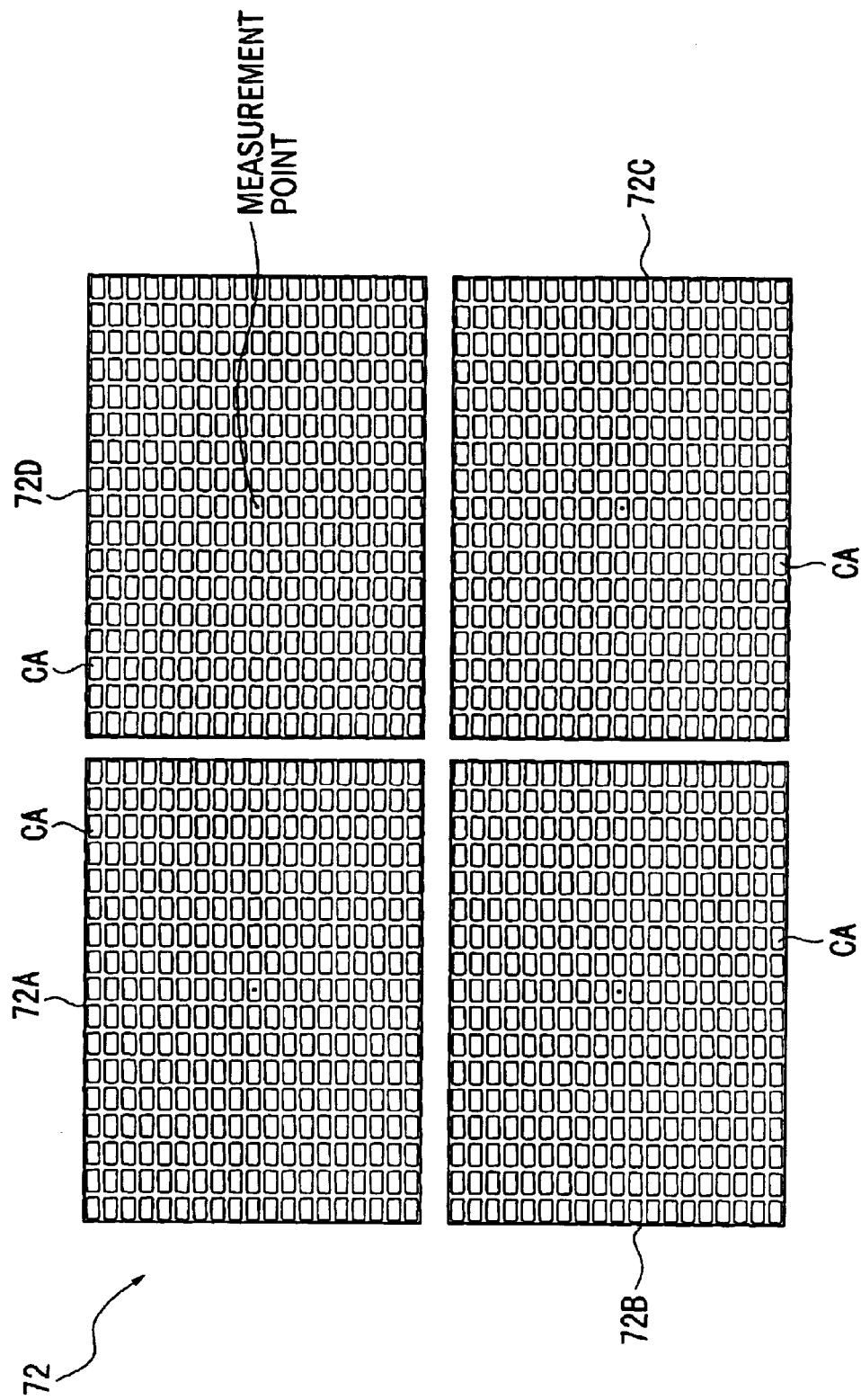
FIG. 13 is an illustration showing a measurement point of focus adjustment used in the aforesaid respective embodiments.

In the image, for instance, the position moving from the edge corresponding to the four corners of the reference liquid crystal panel toward the diagonal inside direction where the picture element areas CA can be solely displayed on the respective image display areas 72A to 72D as shown in FIG. 13 represents the reference position of the CCD camera 41 for focus adjustment. The central area of the picture element area CA represents the measurement point for conducting focus adjustment.

Figure 14:
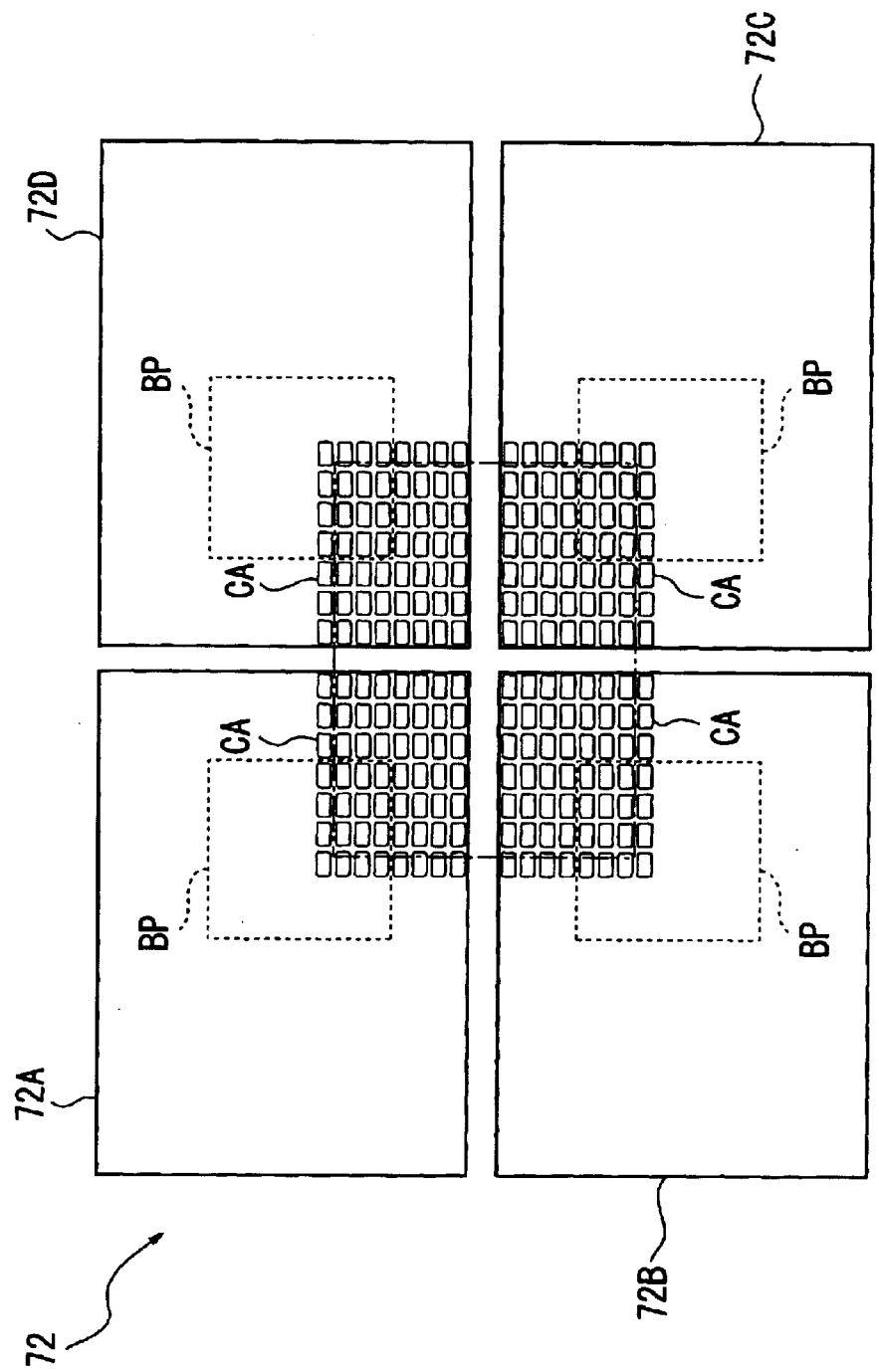
FIG. 14 is an illustration showing a reference pattern BP for focus adjustment used in the aforesaid respective embodiments.

Further, as shown in FIG. 14, corresponding edge positions are displayed on four corners of some reference liquid crystal panel. In the image, the substantially square area where the picture element area CA and the area other than the picture element area CA are set at a predetermined ratio is a reference pattern BP for adjusting alignment of the liquid crystal panels 141R, 141G and 141B. The position of the CCD camera 41 at this time is the reference position for each model. The reference pattern BP is respectively generated for three reference liquid crystal panels. The reference position for alignment adjustment of the CCD camera 41 is set only for a single reference liquid crystal panel.

The reference pattern BP and the reference position of the CCD camera 41 are registered to the storage of the computer 70 as a model data according to each model.

The S1 and S2 steps are conducted to a plurality of models in advance, and the reference pattern BP and reference position of the CCD camera 41 for each model are registered as model data.

A designed reference position of the liquid crystal panels 141R, 141G and 141B relative to the cross dichroic prism 150 in accordance with a plurality of models is registered in the model data as coordinates value.

S3: Subsequently, the cross dichroic prism 150 is set on the support jig 33 (provision step), and the liquid crystal panels 141R, 141G and 141B are attached to the liquid crystal panel holder 317 of the six-axis position adjusting unit 31 while the pin 145 coated with the ultraviolet curing adhesive is inserted.

S4: Next, initializing process is conducted by a program executed by the CPU of the computer 70 prior to actual adjustment work (preliminary step).

Figure 15:
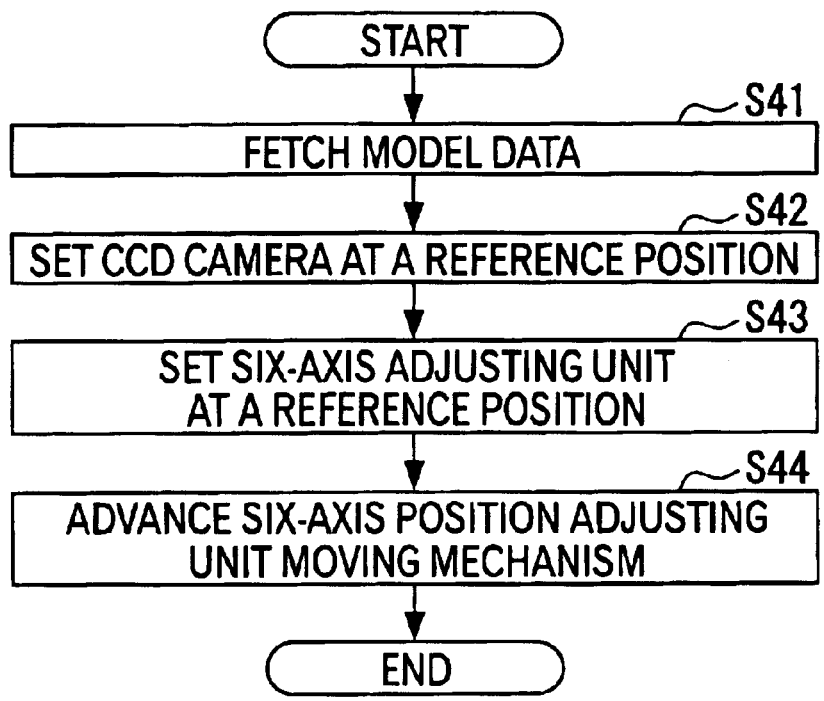
FIG. 15 is a flowchart for illustrating a preliminary step in the first embodiment.

Specifically, the preliminary step is conducted as follows in accordance with the flowchart shown in FIG. 15.

S41: The memory such as RAM (Random Access Memory) connected to the CPU is initialized and the model data registered in advance is fetched in accordance with the type of the cross dichroic prism 150 and the liquid crystal panels 141R, 141G and 141B.

S42: The designed coordinates value of the liquid crystal panels 141R, 141G and 141B of the model data is read and the initial position of the planar position adjuster 311, the in-plane rotary position adjuster 313 and the out-plane position adjuster 315 of the six-axis position adjusting unit 31 is set relative to the six-axis position adjusting unit moving mechanism 31A (initial setting step).

S43: The reference position of the CCD camera 41 of the corresponding model data is read and the CCD camera 41 is moved to be set at the reference position for focus adjustment.

S44: The six-axis position adjusting unit moving mechanism 31A is advanced for a predetermined distance (initial position), so that the pin 145 and the light-incident end surface 151 of the cross dichroic prism 150 are brought into contact.

At this time, the initial position of the six-axis position adjusting unit 31 relative to the six-axis position adjusting unit moving mechanism 31A is set by the initial setting step and the six-axis position adjusting unit moving mechanism 31A is advanced for a predetermined distance relative to the cross dichroic prism 150, so that the liquid crystal panels 141R, 141G and 141B are set at a designed reference position relative to the cross dichroic prism 150.

S5: Thereafter, the position-adjusting light beam is irradiated on, for instance, the liquid crystal panel 141G and the light beam irradiated by the cross dichroic prism 150 is directly received by the CCD camera 41 through the beam splitter 451 (detection step).

S6: The signal from the CCD camera 41 is inputted to the computer 70 for conducting focus and alignment adjustment of the liquid crystal panel 141G by the image processing function thereof (position adjusting step).

Figure 16:
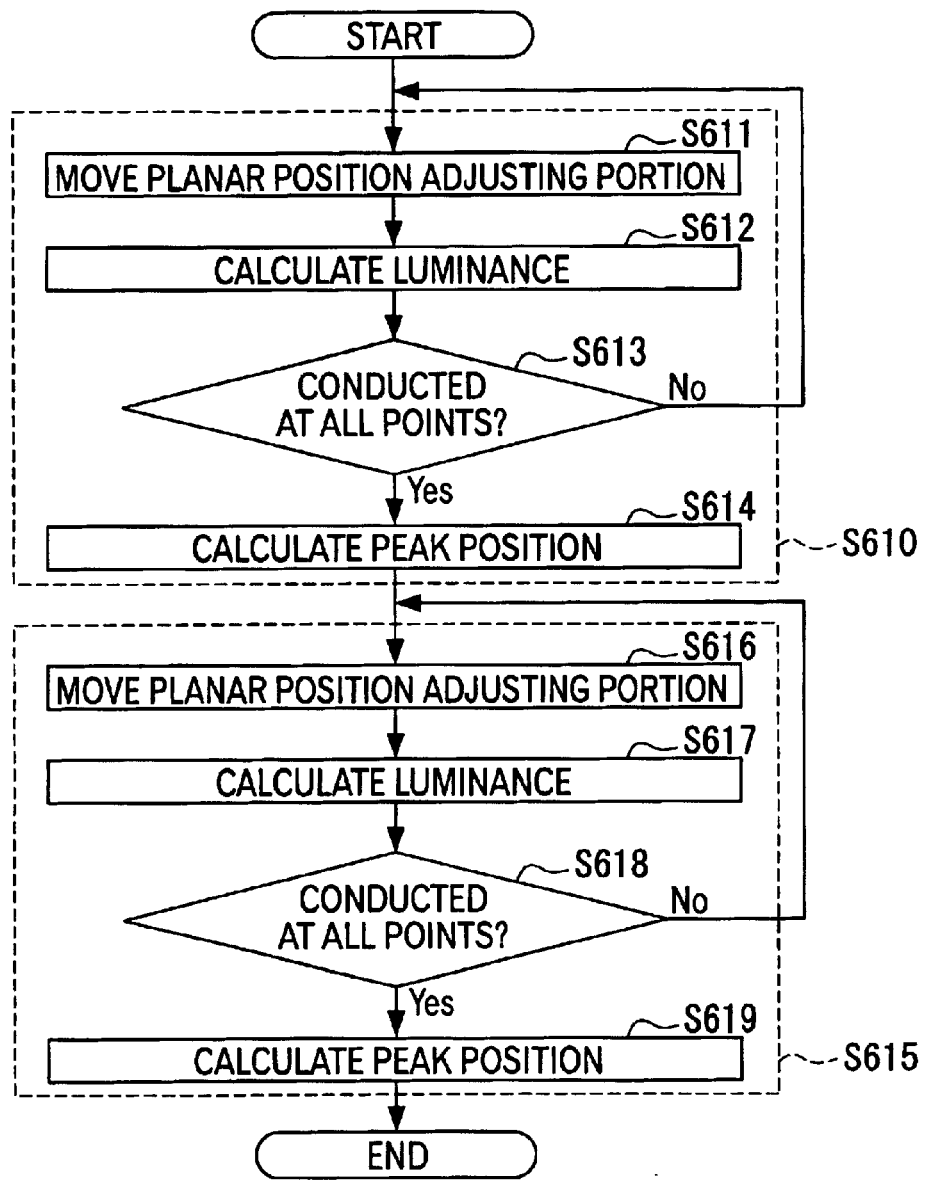
FIG. 16 is a flowchart for illustrating a focus adjustment step in the aforesaid first embodiment.

S61: Initially, the focus of the liquid crystal panel 141G is adjusted in accordance with the flowchart shown in FIG. 16 as follows (focus adjustment step).

The focus adjustment step S61 is conducted in two stages, i.e. a coarse adjustment step S610 including S611 to S614 and a minute adjustment step S615 including S616 to S619.

S611: The planar position adjuster 311 of the six-axis position adjusting unit moving mechanism 31A is moved by a predetermined distance from the initial position for a fixed value designated for each model in the direction away from the cross dichroic prism 150.

S612: The luminance at the measurement point on the central portion of the picture element area CA shown in FIG. 14 of the image imported by the CCD camera 41 is obtained. The luminance is stored in the memory of the computer 70 in accordance with the coordinates position of the planar position adjuster 311.

S613: The movement of the planar position adjuster 311 by a predetermined distance in the S611 and the obtainment of the luminance at the measurement point in the S612 are repeated to obtain the luminance at several points.

Figure 17A:
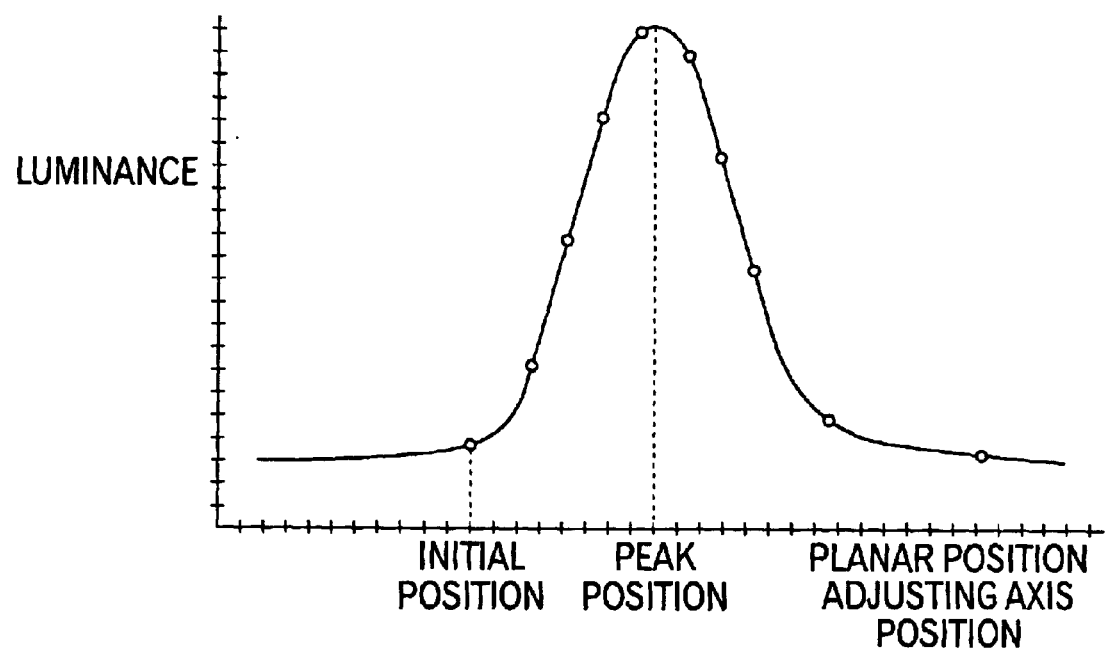
FIGS. 17(A) and (B) are illustrations showing a calculation of a peak position in the focus adjustment step in the aforesaid respective embodiments, FIG. 17(B) being an enlarged view of the peak position in FIG. 17(A)

S614: After completion of the above S613, the computer 70 calculates the peak position by the luminance obtained in the above steps as shown in FIG. 17(A).

After the coarse adjustment step S610 is completed as in the above, the planar position adjuster 311 is moved to the peak position calculated in S614, where the minute adjustment step S615 is conducted as in the following process.

S616: The planar position adjuster 311 of the six-axis position adjusting unit 31 is moved by a predetermined distance from the initial position to the peak position calculated in S614.

S617: The image is detected by the CCD camera 41 and the luminance on the measurement point on the central part of the picture element area CA shown in FIG. 14 is obtained by the imported image. The luminance is stored in the memory of the computer 70 in accordance with the coordinates position of the planar position adjuster 311.

S618: In S616, the planar position adjuster 311 is moved by a smaller pitch than the movement of the coarse adjustment step S610 and the obtainment of luminance is repeated at the measurement point to obtain the luminance at several points.

Figure 17B:
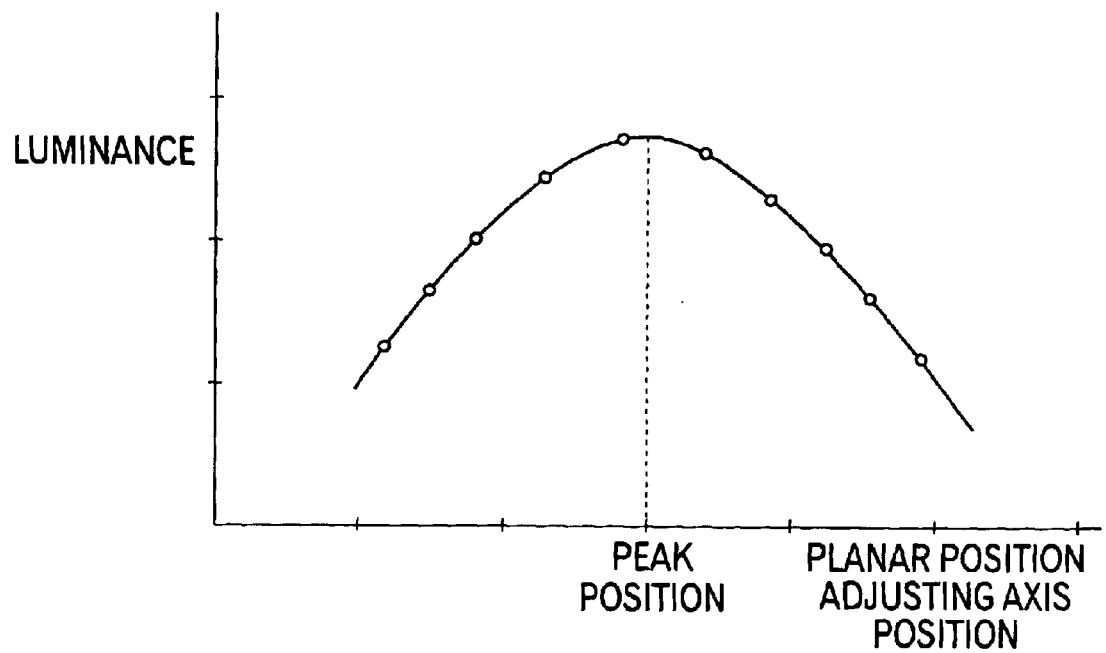

S619: After completion of S618, the computer 70 calculates the peak position based on the luminance obtained in the above steps as shown in FIG. 17(B).

The focus adjustment of the liquid crystal panel 141G is completed by moving the planar position adjuster 311 to the peak position calculated in S619 after completion of the minute adjustment step S615.

S62: After completion of the focus adjustment step S61, the computer 70 locates the CCD camera 41 to a reference position for adjusting alignment. Specifically, the steps of S41 and S43 in the preliminary step S4 are conducted.

S63: Next, the alignment of the liquid crystal panel 141G is adjusted (alignment adjustment step).

Initially, STAGE1 representing the six-axis position adjusting unit 31 holding the liquid crystal panel 141G is selected on the display screen 71 of a program and the image on the four corners of the liquid crystal panel 141G is imported by the CCD camera 41. The image imported by the CCD camera 41 is displayed on the image display view 72 of the display screen 71 of the computer 70, where the measurement data of STAGE 1 after conducting image-processing is displayed on the image processing view 73.

In this condition, when Measurement button on the image processing view 73 is pressed, the portion corresponding to the reference pattern BP is detected on the image processing view 73 and the position of the detected pattern on the screen is detected. The deviation of the detected result from the location of the reference pattern BP registered in the S2 step is calculated, the result of the calculation being displayed on the axis movement display view 74 as the moving amount of the respective axes of the six-axis position adjusting unit 31.

The computer 70 controls the six-axis position adjusting unit 31 based on the moving amount of the respective axes displayed on the axis movement display view 74, thereby adjusting the planar position, in-plane rotary position and out-plane rotary position of the liquid crystal panel 141G.

After completing the adjustment step, the Measurement button is pressed again to calculate the moving amount of the respective axes (S64), the process being conducted until the moving amount of all the axes becomes approximately zero, thereby adjusting the alignment of the liquid crystal panel 141G.

The coordinates value of the liquid crystal panel 141G relative to the cross dichroic prism 150 is stored in the memory of the computer 70 as a reference data.

S7: After terminating the focus and alignment adjustment, ultraviolet is irradiated on the pin 145 to fix the liquid crystal panel 141G.

S8: After completing adjustment of the liquid crystal panel 141G, the above steps of S5, S6 and S7 are sequentially conducted on other liquid crystal panels 141R and 141B.

Specifically, the steps S5 and S6 are continuously conducted for each liquid crystal panels 141R and 141B. At this time, the reference data of the liquid crystal panel 141G is retrieved from the storage to be used as the initial position of the other liquid crystal panels 141R and 141B.

Accordingly, the alignment of the liquid crystal panels 141R and 141B can be adjusted while the relative position of the liquid crystal panels 141R, 141G and 141B are substantially accorded, so that the alignment of the respective liquid crystal panels 141R, 141G and 141B can be accurately and smoothly adjusted. At this time, the reference pattern BP corresponding to the liquid crystal panels 141R and 141B is retrieved from the storage to be used.

S9: In fixing the respective liquid crystal panels 141R, 141G and 141B, in order to check the position shift of the respective liquid crystal panels 141R, 141G and 141B caused on account of curing contraction of adhesive, position-adjusting light beam is irradiated on the liquid crystal panels 141R, 141G and 141B to detect the light beam irradiated from the cross dichroic prism 150 directly by the CCD camera 41 through the beam splitter 451. The shift of picture element is measured by the displayed image.

S10: The computer 70 controls the actuator 317C and releases the respective liquid crystal panels 141 from being held by the liquid crystal panels holder 317 of the respective six-axis position adjusting unit 31 and retracts the six-axis position adjusting unit moving mechanism 31A by a predetermined distance to escape the respective six-axis position adjusting unit 31 in a direction away from the respective liquid crystal panels 141R, 141G and 141B. Thereafter, the produced optical unit 170 is removed.

[5. Advantage of Embodiment]

According to the present embodiment, following advantages can be obtained.

(1) In the light beam sensor 40 of the position adjuster 2, since the light beam irradiated by the cross dichroic prism 150 is directly imported by the CCD camera 41 through the beam splitter 451, the respective steps (S1–S7) can be implemented without using the conventional projection screen, so that the size of the position adjuster 2 can be greatly reduced.

Accordingly, the space required for installing the position adjuster can be reduced, thereby enhancing efficiency for using the workspace.

(2) Since the light guide 45 having the beam splitter 451 is used, the light beam irradiated by the cross dichroic prism 150 can be refracted by ninety degrees and the CCD cameras 41 can be located around the cross dichroic prism 150. Accordingly, since the CCD camera 41 is not necessary to be provided along the irradiation direction of the cross dichroic prism 150, the size enlargement of the position adjuster 2 in the direction can be prevented, thus further enhancing size reduction of the position adjuster 2.

(3) Since the light guide 45 includes the beam splitter 451, the light guide 45 can be simply constructed with sufficient function and production thereof can be conducted with low cost, so that economical burden can be reduced even when the light guide 45 is prepared for each model.

Further, though the CCD camera has to be moved with a large-scale moving mechanism since the projection image size on the screen is greatly different in the conventional device, in the device of the present embodiment, the CCD camera have only to be moved for the size difference of the liquid crystal panels 141R, 141G and 141B according to respective models. Accordingly, the size of the moving mechanism 43 can be reduced and no large-scale moving mechanism is necessary, thereby also reducing the economic burden therefor.

(4) Since the light beam sensor 40 is constructed of the four CCD cameras 41, the four corners of the liquid crystal panels 141R, 141G and 141B can be taken by the respective CCD cameras 41 and displayed on the respective image display areas 72A to 72D. Accordingly, more accurate adjustment is possible by adjusting focus and alignment at all the image-taken parts while checking the display condition at the respective image display areas 72A to 72D.

(5) Since the four CCD cameras 41 are disposed corresponding to the diagonal line of the rectangular image formation area of the liquid crystal panels 141R, 141G and 141B, the interference among the CCD cameras 41 can be avoided and the moving mechanism 43 can be easily disposed using the space between the CCD cameras 41.

(6) Since the steps S5 and S6 are repeated for each liquid crystal panel 141R, 141G and 141B, the CCD camera 41 can be commonly used in adjusting the respective liquid crystal panels 141R, 141G and 141B, so that the liquid crystal panels 141R, 141G and 141B can be adjusted by the small number of (four) CCD cameras 41.

(7) Since the six-axis position adjusting unit 31 is supported by the six-axis position adjusting unit moving mechanism 31A, the liquid crystal panels 141R, 141G and 141B can be set at a designed predetermined position relative to the cross dichroic prism 150 by advancing the six-axis position adjusting unit moving mechanism 31A by a predetermined distance (S44) while locating the six-axis position adjusting unit 31 at the initial position relative to the six-axis position adjusting unit moving mechanism 31A and holding the liquid crystal panels 141R, 141G and 141B by the liquid crystal panels holder 317 of the six-axis position adjusting unit 31 during the initial setting step S42.

Accordingly, the position adjustment of the liquid crystal panel 141R, 141G and 141B during position adjusting step S6 can be simplified and the cycle time can be reduced.

(8) Since the position adjusting step S6 includes the focus adjustment step S61 and the alignment adjustment step S62, while the advancement and retraction positions of the liquid crystal panels 141R, 141G and 141B relative to the cross dichroic prism 150 are adjusted by the six-axis position adjusting unit moving mechanism 31A and the base 311A of the six-axis position adjusting unit 31, the planar position, the in-plane rotary position and the out-plane rotary position of the liquid crystal panels 141R, 141G and 141B can be adjusted by the six-axis position adjusting unit 31.

Accordingly, the liquid crystal panels 141R, 141G and 141B are located at a back focus position of the projection lens 160 and the mutual position of the respective liquid crystal panels 141R, 141G and 141B is adjusted, so that the liquid crystal panels 141R, 141G and 141B can be located at an appropriate position relative to the cross dichroic prism 150.

(9) Since the six-axis position adjusting unit moving mechanism 31A moves in a direction toward and away from the cross dichroic prism 150 relative to the platform 25 within a range of millimeter to centimeter order and the base 311A can be moved relative to the six-axis position adjusting unit moving mechanism 31A in the same direction as the six-axis position adjusting unit moving mechanism 31A within a range of micrometer to millimeter order, the moving range of the liquid crystal panels 141R, 141G and 141B can be set wide, thereby easily and rapidly conducting the position adjustment of the liquid crystal panels 141R, 141G and 141B.

(10) Since the six-axis position adjusting unit moving mechanism 31A can be greatly displaced, the interference of the components can be avoided in attaching the liquid crystal panels 141R, 141G and 141B to the cross dichroic prism 150 and in removing the integrated liquid crystal panels 141R, 141G and 141B and the cross dichroic prism 150, thereby enhancing the speed of the process.

[Second Embodiment]

Next, the second embodiment of the present invention will be described below.

In the following, the same reference numeral will be attached to the structure and components identical with the first embodiment to omit or simplify the detailed description.

In the position adjuster of the optical modulator in the first embodiment, the same position adjusting operation is repeated in producing a plurality of projectors 100 (optical unit 170) using the same software.

On the other hand, in the position adjuster of the optical modulator according to the present embodiment, when a plurality of projectors 100 (optical units 170) are produced, another software is used after the position adjustment is normally completed.

Specifically, the position adjustment operation of the respective liquid crystal panels 141R, 141G and 141B of the initially produced optical units 170 is conducted in the same manner as the first embodiment.

In the optical unit 170 produced after producing the first unit, the position adjustment of the respective liquid crystal panels 141R, 141G and 141B is conducted based on the flowcharts shown in FIGS. 12, 18 and 19 as follows.

As in the first embodiment, the model registering operation for registering the model data corresponding to specific type is conducted in S1 and S2. Thereafter, the cross dichroic prism 150 is set on the support jig 33 in the setting step S3 and the liquid crystal panels 141R, 141G and 141B to be adjusted are attached to the liquid crystal panel holder 317 of the six-axis position adjusting unit 31.

Figure 18:
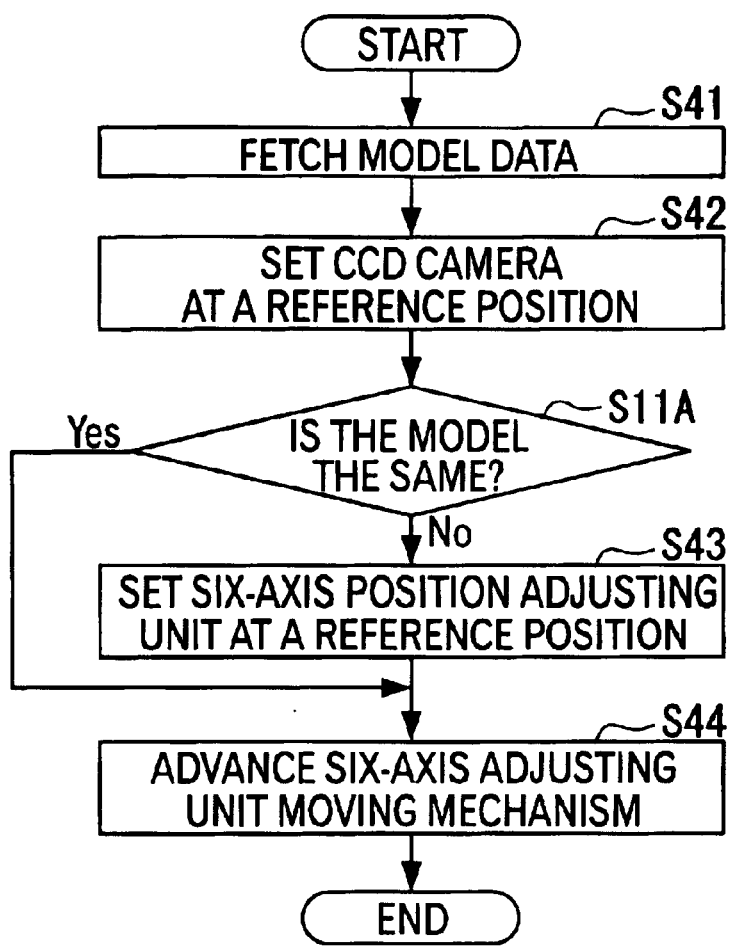
FIG. 18 is a flowchart for showing a preliminary step in the second embodiment.

Subsequently, as shown in FIG. 18, the model data is fetched in the preliminary step S4 (S41) and the computer determines whether the optical unit 170 of the same manufacture model is successively produced or not (model determining step: S11A). When the same model is produced, the initial setting step S42 is omitted and the CCD camera 41 is set at the reference position based on the model data (S43). Further, the six-axis position adjusting unit moving mechanism 31A is advanced by a predetermined distance (S44).

In other words, when the optical unit 170 of the same manufacture model is successively produced, the reference position of the six-axis position adjusting unit 31 is set at the position of the six-axis position adjusting unit 31 set during the preceding position adjusting step S6.

Thereafter, the detection step S5 is conducted in the same manner as the first embodiment and the process proceeds to the position adjusting step S6.

Figure 19:
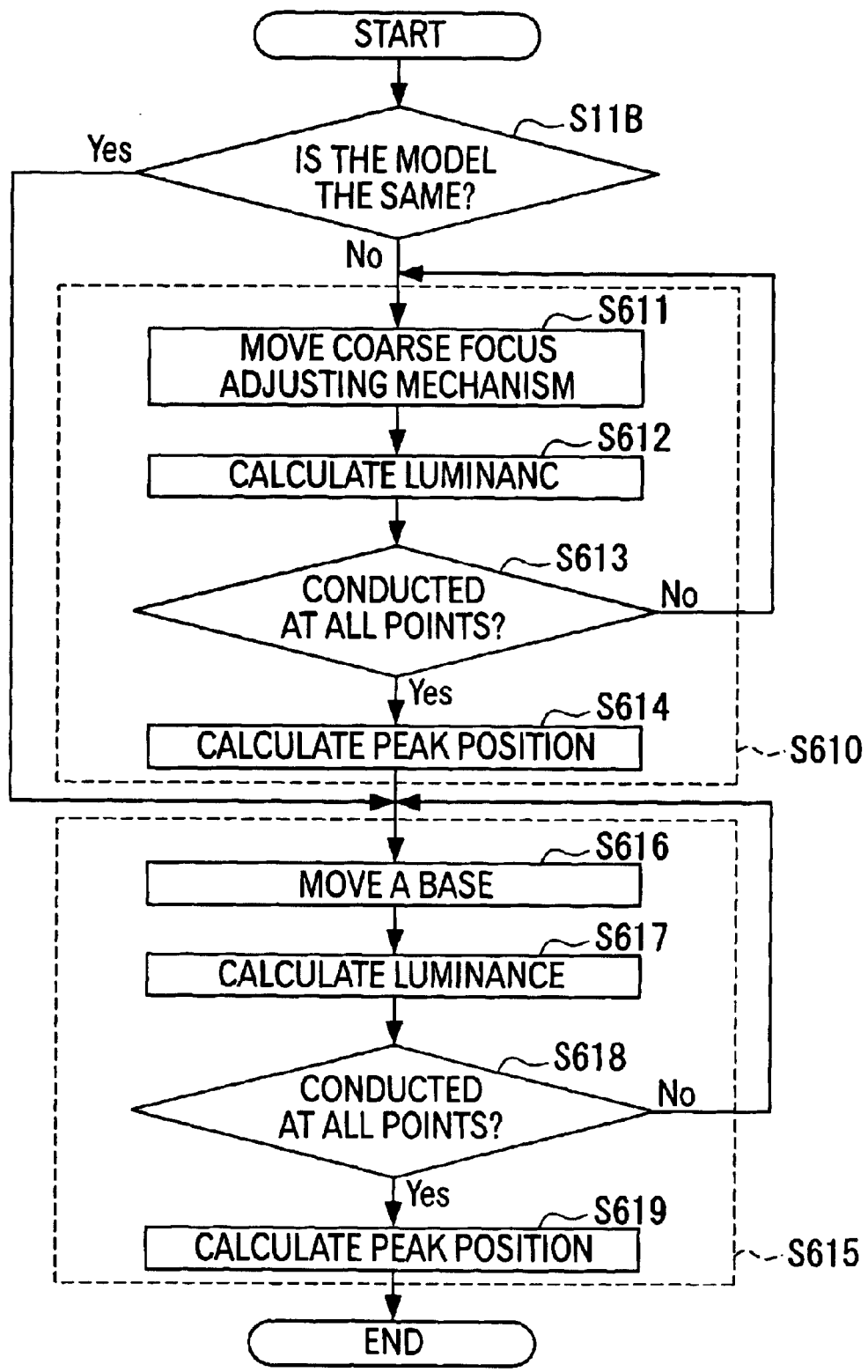
FIG. 19 is a flowchart showing a focus adjustment step in the second embodiment.

As shown in FIG. 19, in the focus adjustment step S61 of the position adjusting step S6, the computer judges whether the optical unit 170 of the same manufacture model is successively produced or not (model determination step S11B). When the same manufacture model is produced, the coarse adjustment step S610 is omitted and the process proceeds to the minute adjustment step S615.

In other words, when the optical unit 170 of the same model is successively produced, the initial position of the planar position adjuster 311 of the six-axis position adjusting unit moving mechanism 31A is set at the position of the planar position adjustment axis set during the minute adjustment step S615 of the preceding focus adjustment step S615 (i.e. set at the focus position of preceding production process).

Thereafter, by conducting the alignment adjustment step S62 as in the first embodiment and conducting the steps of S7 to S10 after completing the position adjusting step S6, a plurality of optical units 170 can be successively produced.

In the above, when a malfunction is determined during picture element shift measurement in the S9 step, the computer 70 cancels the series of above steps, and again conducts the same step as the first embodiment.

According to the above second embodiment, following effects can be obtained as well as the above effects (1) to (10).

(11) When a plurality of optical units 170 are produced and the position of a plurality of liquid crystal panels 141R, 141G and 141B is successively adjusted relative to the cross dichroic prism 150, whether the same model is successively produced or not is determined in the model determination steps S11A and S11B, and the initial setting step S42 and the coarse adjustment step S610 are omitted when the same model is determined, so that excessive process in successively producing the same model can be eliminated.

Accordingly, the cycle time for producing the optical unit 170 can be reduced and the position of a plurality of liquid crystal panels 141R, 141G and 141B of a plurality of optical units 170 can be successively and smoothly conducted.

(12) The computer 70 conducts the same normal process as in the first embodiment without omitting the initial setting step S42 and the coarse adjustment step S610 when a malfunction is determined in the picture element shift measurement step S9. Accordingly, production of the optical unit 170 using the position established in producing preceding inferior product can be avoided, thereby efficiently producing a plurality of optical units 170.

[6. Modifications]

The scope of the present invention is not restricted to the above embodiment but includes other arrangements as long as an object of the present invention can be achieved, which includes following modifications etc.

Figure 20:
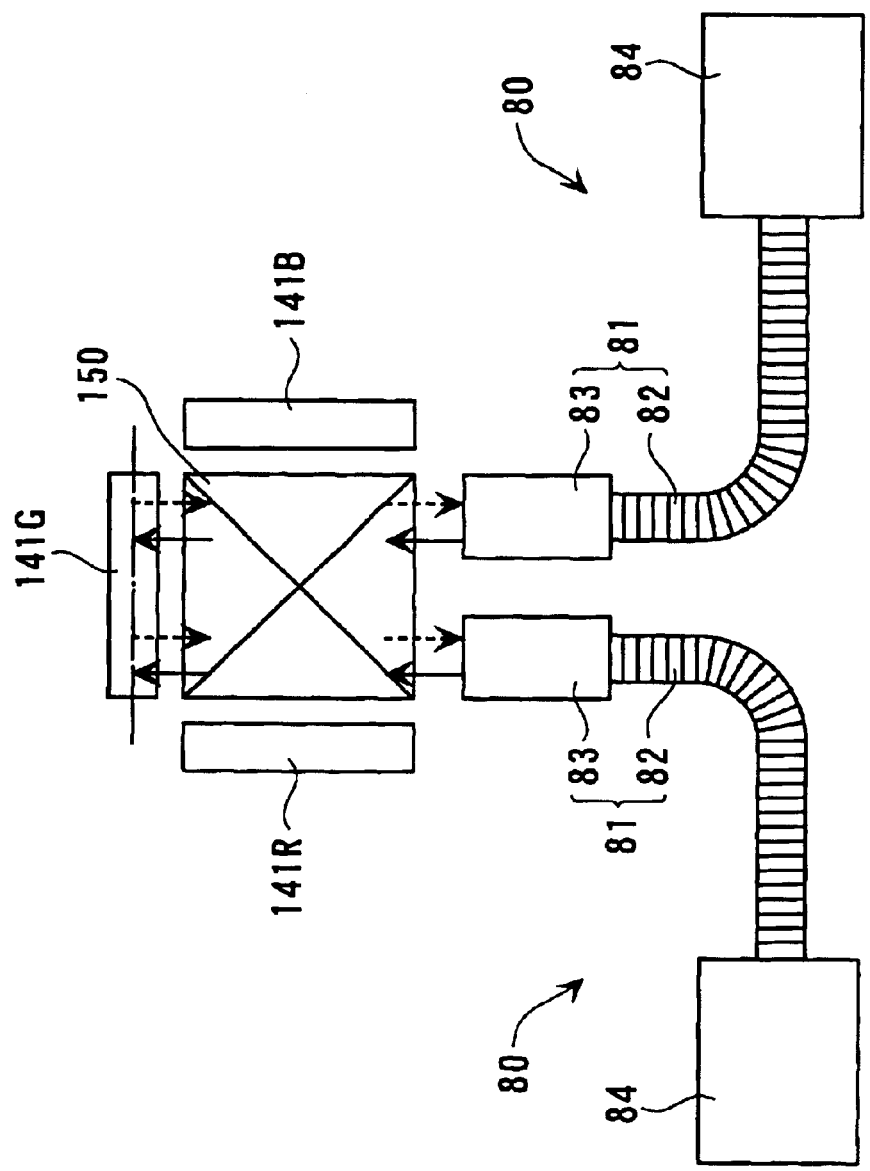
FIG. 20 is a plan view showing a modification of the present invention.

Though the light beam irradiated by the cross dichroic prism 150 is directly imported by the surrounding CCD cameras 41 after being refracted by the beam splitter 451, a light beam sensor 80 may be constructed using, for instance, a fiber scope 81 capable of introducing the irradiated light beam as shown in FIG. 20.

In FIG. 20, though detail such as cross section thereof etc. is not specifically illustrated, the fiber scope 81 of the light beam sensor 80 has a fiber body 82 including a light beam importing optical fiber as a light guide for introducing and transmitting the light beam irradiated by the cross dichroic prism 150, a light-supplying optical fiber disposed along the light beam importing optical fiber, and an insulation for covering the optical fibers. An optical component 83 installed with an objective lens etc. is provided on an end of the fiber body 82 and a CCD unit 84 installed with an adjusting light source is connected to the other end.

Incidentally, the fixing ultraviolet light source is provided on the side of the liquid crystal panels 141R, 141G and 141B.

The light beam importing optical fiber is connected to the charge coupled device in the CCD unit 84 via optical component such as a lens and the light-supplying optical fiber is connected to the adjusting light source. The adjusting light source and the light-supplying optical fiber constitutes light source supply according to the present invention.

In the light beam sensor 80 using the fiber scope 81, the position-adjusting light beam (solid line arrow) from the adjusting light source is initially irradiated on the cross dichroic prism 150 through the light-supplying optical fiber and the optical component 83 and is reflected by the liquid crystal panels 141R, 141G and 141B. The reflected light beam (dotted line arrow) is received by the optical component 83 and is transmitted by the light beam importing optical fiber to be received by the CCD unit 84.

Using the light beam sensor 80, since the light guide of the present invention is made of the light beam importing optical fiber, the location efficiency of the light guide can be improved using dead space by, for instance, bending the light beam importing optical fiber in a desired direction, so that the size reduction of the position adjuster can be further enhanced.

Further, since the position adjusting light beam is supplied from the side of the cross dichroic prism 150, the light source unit 37 including the unit body 371 as shown in FIG. 7 is not necessary to be provided on the side of the liquid crystal panel holder 317 of the six-axis position adjusting unit 31, thereby simplifying the structure around the liquid crystal panel holder 317.

Figure 21:
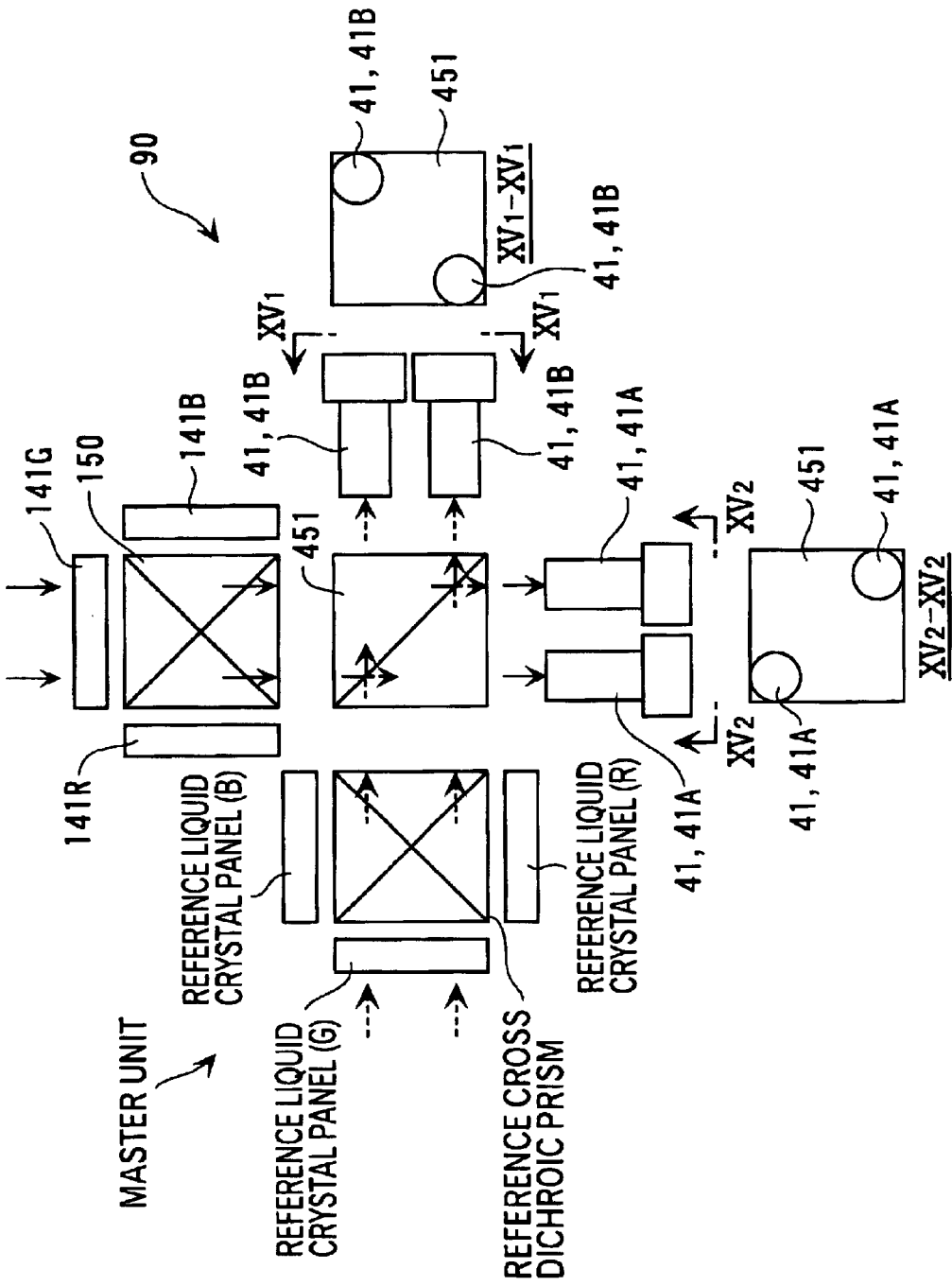
FIG. 21 is a plan view showing another modification of the present invention.

Another modification of the light beam sensor may be arranged as shown in FIG. 21.

In FIG. 21, a light beam sensor 90 has a single beam splitter 451 constituting the light guide provided on the incident-side of the cross dichroic prism 150, a pair of CCD cameras 41 (41A) provided opposite to the cross dichroic prism 150 with the beam splitter 451 therebetween, and another pair of CCD cameras 41 (41B) opposing to one of the remaining two sides of the beam splitter 451. The master unit is disposed opposing to the remaining one side of the beam splitter 451.

The beam splitter 451 of the light beam sensor 90 directly transmits half of the light beam (solid line arrow) irradiated by the cross dichroic prism 150 to be incident on the CCD camera 41A and refracts another half thereof by ninety degrees to introduce to the CCD camera 41B. The beam splitter 451 also directly transmits half of the light beam (dotted line arrow) irradiated from the reference cross dichroic prism to be incident on the CCD camera 41B and refracts another half by ninety degrees to introduce to the CCD camera 41A.

The combination of CCD cameras 41A and the CCD cameras 41B are located at a position corresponding to the four corners of the respective image formation area of the liquid crystal panels 141R, 141G and 141B and the respective reference liquid crystal panels (R, G, B) and correspondingly on one diagonal line of the image formation area.

According to the above light beam sensor 90, by switching the position-adjusting light beam supplied to the master unit and the position-adjusting light beam to be supplied to the liquid crystal panels 141R, 141G and 141B, the cross dichroic prism 150 and the liquid crystal panels 141R, 141G and 141B can be adjusted and fixed while keeping the master unit being put on the support jig, so that usability thereof can be enhanced as compared to the above-described embodiment where the master unit has to be detached.

Though the position-adjusting light beam received by the light beam sensor 40 is supplied from the side of the liquid crystal panels 141R, 141G and 141B in the above-described embodiment, the light may be supplied from the side of the light guide 45. Specifically, the light beam is initially transmitted and supplied through the beam splitter 451 of the light guide 45 and the transmitted light beam is incident on the cross dichroic prism 150. Thereafter, the transmitted light beam is reflected by the liquid crystal panels 141R, 141G and 141B and the reflected light beam is entered again to the cross dichroic prism 150 to be refracted by the beam splitter 451 to be received by the CCD camera 41.

According to the above arrangement, the light source unit 37 is not necessary to be provided on the side of the liquid crystal panel holder 317, thereby simplifying the surrounding structure.

Though the adjusting process and fixing process are sequentially conducted for each liquid crystal panels 141R, 141G and 141B in the above-described embodiment, the light beam may be simultaneously supplied to the respective liquid crystal panels 141R, 141G and 141B and the light beam (white light) irradiated by the cross dichroic prism 150 may be received by the CCD camera (3 CCD camera) 41, so that the adjusting process and the fixing process of the liquid crystal panels 141R, 141G and 141B may be simultaneously conducted.

According to the above arrangement, though the structure can be complicated since the received light beam has to be separated into three colors of red, green and blue by the light beam sensor 40, the time required for adjusting and fixing processes can be greatly reduced.

Though the liquid crystal panels 141R, 141G and 141B are used as the optical component for modulating the light in accordance with the image signal in the above-described embodiment, such arrangement is not restricting. Specifically, the present invention may be applied for adjusting the position of objects other than the liquid crystal panel such as a device using a micro-mirror as an optical component for optical modulation.

Other specific arrangement and configuration in implementing the present invention may be used as long as an object of the present invention can be achieved.

Industrial Availability

The present invention can be applied as a position adjuster of an optical modulator for adjusting mutual position of respective optical modulators and a position adjusting method of an optical modulator for producing a projector having a color separating optical system for separating a light beam irradiated by a light source into a plurality of color lights, a plurality of optical modulators for modulating the respective color lights separated by the color separating optical system in accordance with image information, and a color combining optical system for combining the light beam modulated by the respective optical modulators.

What is claimed is:

1. A position adjuster of an optical modulator that adjusts relative position of a plurality of optical modulators, the position adjuster being used for producing a projector having a light source that irradiates a light beam, a plurality of optical modulators that modulate the light beam in accordance with image information, and a color combining optical system that combines the light comprising:

a light beam sensor that directly receives a position-adjusting light beam irradiated by the optical modulator through the color combining optical system.

2. The position adjuster of an optical modulator according to claim 1, the light beam sensor comprising: a light guide that introduces the light beam irritated from the color combining optical system in a predetermined direction; and an image sensor that receives the light beam guided by the light guide and converts the light beam into an electrical signal.

3. The position adjuster of an optical modulator according to claim 2, wherein the light guide includes a reflection mirror that reflects and refracts the light beam irradiated by the color combining optical system.

4. The position adjuster of an optical modulator according to claim 2, wherein the light guide includes an optical fiber that introduces the light beam irradiated by the color combining optical system to the image sensor.

5. The position adjuster of an optical modulator according to claim 2, wherein the light beam sensor includes a light supply that supplies the position-adjusting light beam.

6. The position adjuster of an optical modulator according to claim 2, wherein the light beam sensor includes a plurality of image sensors.

7. The position adjuster of an optical modulator according to claim 6, wherein the plurality of image sensors are correspondingly located on a diagonal line of a rectangular image formation area of the optical modulator.

8. The position adjuster of an optical modulator according to claim 1, further comprising a position adjusting portion that holds the optical modulator and adjusts the position of the optical modulator relative to the color combining optical system, the position adjusting portion being supported by a coarse focus adjusting mechanism that is moved toward and away from the color combining optical system.

9. A position adjusting method of an optical modulator that adjusts relative position of a plurality of optical modulators, the position adjusting method being used for producing a projector including a light source that irradiates a light beam, a plurality of optical modulators that modulate the light beam in accordance with image information, and a color combining optical system that combines the light beam modulated by the optical modulators, the position adjusting method comprising:

a preliminary step that, based on a plurality of reference optical modulators and a reference color combining optical system of which relative position is adjusted in advance, sets a position of light beam sensor capable of receiving a light irradiated by the reference color combining optical system;

a provision step that sets the color combining optical system relative to the light beam sensor;

a detection step that introduces the light beam to the optical modulator to be adjusted for directly detecting the light beam irradiated via the color combining optical system by the light beam sensor; and a position adjusting step that adjusts the position of the optical modulator based on the detected light beam.

10. The position adjusting method of an optical modulator according to claim 9, wherein the detection step and the position adjusting step are continuously conducted for every optical modulator.

11. The position adjusting method of an optical modulator according to claim 9, wherein the preliminary step has an initial setting step where the position of an position adjusting portion that adjusts the position of the optical modulator at a predetermined designed position relative to the coarse focus adjusting mechanism moving toward and away from the color combining optical system.

12. The position adjusting method of an optical modulator according to claim 11, wherein the position of the optical modulator is successively adjusted for a plurality of projectors, the method comprising a type determining step in which whether the same type of projectors are successively produced or not is determined, where the initial setting step and/or the coarse adjusting step is omitted when the type of the projectors are determined to be the same in the type determining step.

13. The position adjusting method of an optical modulator according to claim 9, wherein the position adjusting step includes a focus adjusting process where advancement and retraction positions relative to the color combining optical system are adjusted and an alignment adjusting process where the mutual position of respective optical modulators is adjusted.

14. The position adjusting method of an optical modulator according to claim 13, wherein the focus adjusting process includes a coarse adjusting step where the focus of the optical modulator is adjusted by advancing and retracting a coarse focus adjusting mechanism that moves the optical modulator toward and away from the color combining optical system, and a minute adjusting step by the position adjusting portion that adjusts the position of the optical modulator.

15. A projector, comprising:

a light source that irradiates a light beam;

a plurality of optical modulators that modulate the light beam in accordance with image information; and a color combining optical system that combines the light beam modulated by the optical modulator;

the position of the optical modulators being adjusted by the method according to claim 9.

16. The projector according to claim 15, wherein the detection step and the position adjusting step are continuously conducted for every optical modulator.

17. The projector according to claim 15, wherein the preliminary step has an initial setting step where the position of a position adjusting portion that adjusts the position of the optical modulator at a predetermined designed position relative to the coarse focus adjusting mechanism moving toward and away from the color combining optical system.

18. The projector according to claim 15, wherein the position adjusting step includes a focus adjusting process where advancement and retraction positions relative to the color combining optical system are adjusted and an alignment adjusting process where the mutual position of respective optical modulators is adjusted.

19. The projector according to claim 18, wherein the focus adjusting process includes a coarse adjusting step where the focus of the optical modulator is adjusted by advancing and retracting a coarse focus adjusting mechanism that moves the optical modulator toward and away from the color combining optical system, and a minute adjusting step by the position adjusting portion that adjusts the position of the optical modulator.

20. The projector according to claim 17, wherein the position of the optical modulator is successively adjusted for a plurality of projectors, the method comprising a type determining step in which whether the same type of projectors are successively produced or not is determined, where at least one of the initial setting step and the coarse adjusting step is omitted when the type of the projectors are determined to be the same in the type determining step.

* * * * *